US012746498B2

(12) United States Patent

Ballanger et al.

(10) Patent No.: US 12,746,498 B2
(45) Date of Patent: Sep. 29, 2026

(54) FILTER SYSTEM, FILTER MOUNTING MECHANISM, AND FILTER ELEMENTS USED IN AND WITH THE FILTER SYSTEM AND FILTER MOUNTING MECHANISM

(71) Applicants: James J. Ballanger, Gosport (GB); Casey C. Dent, Olathe, KS (US); Richard Paul Steele, Botley (GB); Stephen D. Hiner, Salisbury (GB); Timothy A. Ajayi, Brentford (GB); Kate Taylor, Hants (GB)

(72) Inventors: James J. Ballanger, Gosport (GB); Casey C. Dent, Olathe, KS (US); Richard Paul Steele, Botley (GB); Stephen D. Hiner, Salisbury (GB); Timothy A. Ajayi, Brentford (GB); Kate Taylor, Hants (GB)

(73) Assignees: Parker-Hannifin Corporation, Cleveland, OH (US); Altair (UK) Ltd., Hemel Hempstead (GB)

( * ) Notice: Subject to any disclaimer, the term of this patent is extended or adjusted under 35 U.S.C. 154(b) by 338 days.

(21) Appl. No.: 18/476,843

(22) Filed: Sep. 28, 2023

(65) Prior Publication Data

US 2024/0024808 A1 Jan. 25, 2024

Related U.S. Application Data

(63) Continuation of application No. PCT/US2022/022577, filed on Mar. 30, 2022.

(Continued)

(51) Int. Cl.

*B01D 46/00* (2022.01)
*B01D 46/24* (2006.01)

(52) U.S. Cl.

CPC ........ *B01D 46/001* (2013.01); *B01D 46/2411* (2013.01); *B01D 2271/022* (2013.01)

(58) Field of Classification Search

CPC .......................... B01D 46/001; B01D 46/2411

See application file for complete search history.

(56) References Cited

U.S. PATENT DOCUMENTS 3,878,757 A 4/1975 Puklus, Jr.
4,297,115 A 10/1981 Johnson, Jr.

(Continued)

FOREIGN PATENT DOCUMENTS

CN 2400667 Y 10/2000
CN 101111297 A 1/2008

(Continued)

OTHER PUBLICATIONS http://www.idsmachine.com/qcknob.html ; Jul. 30, 2020.

*Primary Examiner* — Robert A Hopkins

(74) *Attorney, Agent, or Firm* — Reinhart Boerner Van Deuren P.C.

(57) ABSTRACT

Filter elements, filter mounting systems, filter systems, methods of servicing filter systems, and methods of mounting filter elements are provided herein. The mounting system may include a quick attach attachment member that can be both axially slid along a mounting shank as well as threadedly engaged therewith. Torque limiting features may be provided to limit the amount of loading that may be provided by an attachment member to a filter element. Identifiers of appropriate tightening of attachment members may be provided. Clocking features and mechanisms for better balancing loading on seal members may be provided.

15 Claims, 28 Drawing Sheets

Related U.S. Application Data

(60) Provisional application No. 63/315,845, filed on Mar. 2, 2022, provisional application No. 63/168,850, filed on Mar. 31, 2021.

(56) References Cited

U.S. PATENT DOCUMENTS

| | | | | |
|---|---|---|---|---|
| 4,613,438 | A | 9/1986 | DeGraffenreid | |
| 4,715,954 | A | 12/1987 | DeGraffenreid | |
| 5,076,918 | A | 12/1991 | Foust et al. | |
| 5,250,179 | A | 10/1993 | Spearman | |
| 5,308,485 | A | 5/1994 | Griffin et al. | |
| 5,526,554 | A | 6/1996 | Runde | |
| 5,632,791 | A | 5/1997 | Oussoren et al. | |
| 5,783,086 | A | 7/1998 | Scanlon et al. | |
| 5,954,849 | A | 9/1999 | Berkhoel et al. | |
| 6,174,206 | B1 | 1/2001 | Yentile et al. | |
| 6,358,292 | B1 | 3/2002 | Clements | |
| 6,673,136 | B2 | 1/2004 | Gillingham et al. | |
| 6,726,735 | B1 * | 4/2004 | Oussoren | B01D 46/521 210/473 |
| 6,808,552 | B2 | 10/2004 | Borla | |
| 6,916,353 | B2 | 7/2005 | Tang | |
| 6,991,665 | B1 | 1/2006 | Allen et al. | |
| 7,186,284 | B2 | 3/2007 | Clements | |
| 7,374,595 | B2 | 5/2008 | Gierer | |
| 7,520,913 | B2 | 4/2009 | Mills et al. | |
| 8,052,770 | B2 | 11/2011 | Ayshford et al. | |
| 8,070,848 | B2 | 12/2011 | Cosgrove | |
| 8,128,742 | B1 | 3/2012 | Mills et al. | |
| 8,147,691 | B2 | 4/2012 | Krull et al. | |
| 8,268,032 | B2 | 9/2012 | Eyers et al. | |
| 8,440,002 | B2 | 5/2013 | Jarrier et al. | |
| 8,480,776 | B2 | 7/2013 | Jen et al. | |
| 8,646,149 | B2 | 2/2014 | Conrad | |
| 8,673,040 | B2 | 3/2014 | Handley et al. | |
| 8,715,384 | B2 | 5/2014 | Saraswathi et al. | |
| 8,721,756 | B2 | 5/2014 | Handley et al. | |
| 8,734,572 | B2 | 5/2014 | Zhang et al. | |
| 8,747,512 | B2 | 6/2014 | Mills et al. | |
| 8,956,434 | B2 | 2/2015 | Vanderlinden et al. | |
| 9,555,347 | B2 | 1/2017 | Tucker et al. | |
| 9,610,529 | B2 | 4/2017 | Mills et al. | |
| 9,936,975 | B2 | 4/2018 | Siemer et al. | |
| 9,962,641 | B2 | 5/2018 | Van Den Bossche et al. | |
| 10,035,087 | B2 | 7/2018 | Vercammen | |
| 10,149,586 | B2 | 12/2018 | Liu | |
| 10,279,302 | B2 | 5/2019 | Mills et al. | |
| 2004/0103626 | A1 | 6/2004 | Warth et al. | |
| 2004/0159239 | A1 | 8/2004 | Nagem | |
| 2006/0091061 | A1 | 5/2006 | Brown | |
| 2006/0138038 | A1 | 6/2006 | Proulx et al. | |
| 2008/0022856 | A1 | 1/2008 | Clements | |
| 2008/0092501 | A1 | 4/2008 | Sporre et al. | |
| 2008/0229927 | A1 | 9/2008 | Singh et al. | |
| 2011/0154991 | A1 | 6/2011 | Steele et al. | |
| 2011/0290116 | A1 | 12/2011 | Jarrier et al. | |
| 2013/0014479 | A1 | 1/2013 | Mann et al. | |
| 2014/0260138 | A1 | 9/2014 | Edwards et al. | |
| 2015/0367273 | A1 | 12/2015 | Boehrs et al. | |
| 2017/0173512 | A1 | 6/2017 | Van Den Bossche et al. | |
| 2018/0345192 | A1 | 12/2018 | Clarke et al. | |
| 2019/0263569 | A1 | 8/2019 | Smith | |
| 2019/0291039 | A1 | 9/2019 | Mills et al. | |
| 2020/0139288 | A1 | 5/2020 | Decugniere | |
| 2021/0046415 | A1 | 2/2021 | Tiffany et al. | |

FOREIGN PATENT DOCUMENTS

| | | | | |
|---|---|---|---|---|
| CN | 104963797 | A | 10/2015 | |
| DE | 29604057 | U1 | 6/1996 | |
| DE | 102004005904 | A1 | 9/2005 | |
| DE | 202007011096 | U1 | 12/2008 | |
| DE | 102012109857 | A1 * | 4/2013 | B01D 29/235 |
| EP | 3 381 536 | A1 | 10/2018 | |
| JP | H11508180 | A | 7/1999 | |
| JP | 2003236326 | A | 8/2003 | |
| JP | 2009018308 | A | 1/2009 | |
| JP | 2012112311 | A | 6/2012 | |
| JP | 2014104465 | A | 6/2014 | |
| KR | 200442850 | Y1 | 12/2008 | |
| WO | WO 2018188597 | A1 | 10/2018 | |
| WO | WO 2019147704 | A1 | 8/2019 | |

* cited by examiner

FILTER SYSTEM, FILTER MOUNTING MECHANISM, AND FILTER ELEMENTS USED IN AND WITH THE FILTER SYSTEM AND FILTER MOUNTING MECHANISM

CROSS-REFERENCE TO RELATED PATENT APPLICATIONS

This patent application is a continuation of co-pending International Application No. PCT/US2022/022577, filed Mar. 30, 2022, and which designates the United States. The entire teachings and disclosure of International Application No. PCT/US2022/022577 are incorporated herein by reference thereto. International Application No. PCT/US2022/022577 claims the benefit of U.S. Provisional Patent Application No. 63/168,850, filed Mar. 31, 2021, and International Application No. PCT/US2022/022577 claims the benefit of U.S. Provisional Patent Application No. 63/315,845, filed Mar. 2, 2022. The entire teachings and disclosures of U.S. Provisional Patent Application Nos. 63/168,850 and 63/315,845 are incorporated herein by reference thereto.

FIELD OF THE INVENTION

This application generally relates to filter systems, filter elements, and mounting mechanisms for filtration applications.

BACKGROUND OF THE INVENTION

Filter systems often use replaceable filter elements that are replaced when damaged or have reached the end of their serviceable life (e.g. when they have become full of particulates removed from the fluid being filtered). Portions of the filter systems, such as portions of the filter system to which the filter elements are mounted or mounting mechanisms for securing the filter elements within the filter system, are often reusable components.

Filter systems such as air intake systems will often have a mounting arrangement where a threaded shaft extends through an end of a filter element. An attachment member such as a nut or threaded handle will attach to the end of the threaded shaft and secure the filter element to the mounting arrangement.

One such system where this type of filter mounting arrangement is often employed is in air intakes for gas turbines. Here, a plurality of filter elements are mounted to a mounting arrangement in the form of a tube sheet. A mounting yoke will extend from the tube sheet and will include the threaded shaft for each of the filter elements that are mounted to the tube sheet. One intake system can have hundreds of individual filter elements.

Due to maintenance costs and the cost of downtime or periods of reduced operational output, it is valuable to limit the amount of time required to remove the old filter element and then mount the new filter element.

It is also desirable to make sure that the amount of load applied to the filter element by the attachment member is within a desired range. If the load is too big or too little, the seal between the filter element and the mounting arrangement (e.g. tube sheet) may be compromised and result in fluid leaks or premature damage to the seal allowing dirty fluid to bypass the filter element.

Additionally, the filter elements are often mounted in a cantilevered orientation with the tube sheet in a vertical orientation. Due to gravity, the cantilevered orientation can generate uneven forces on sealing elements because the sealing forces are not parallel to gravity. Instead, vertically lower portions of a seal may often have higher forces applied thereto than upper portions of the seal. This can require overloading the lower portions of the seal to get sufficient loading of vertically upper portions of the seal or under loading the upper portions of the seal when trying to obtain appropriate sealing forces for the lower portions of the seal, or a combination of both.

Also, because of how the filter elements are mounted and how closely they are positioned, it is often impossible to see the seal with the mounting arrangement to visually inspect the degree to which the seal has or seals have been compressed. This problem can be exacerbated in systems where multiple filter element sections are stacked axially relative to one another with seal members therebetween to form one larger filter element.

Further yet, it can be useful to prevent unauthorized filter elements to be used in a filter system to avoid inferior or inadequate filter elements from being employed.

In addition, due to the number of filter elements that are often employed, the filter elements are often packed close together limiting the flow space between adjacent filter elements. The applicants have determined that as filter elements are packed more tightly and closer together, the limited space therebetween can inhibit air flow upstream of the system which may increase pressure drop across the system. The applicants have determined that reducing flow disturbance and flow separation can reduce flow restriction and turbulence around and through the filter elements, and thus reduce pressure loss. This can allow for any one of or any combination of smaller filter elements, fewer filter elements, more tight packing of the filter elements, or improved pressure performance of the overall system. Reduced flow separation from the upstream surface of the filter element can also improve the full usage of all filter media of the filter elements.

The present disclosure relates to improvements over the current state of the art that can provide one or more of the following: reduced maintenance time and/or improved repeatability in applying a desired seal loading to the filter element and associated seals and/or alternative filter element spacing and/or size and design. These and other advantages of the invention, as well as additional inventive features, will be apparent from the description of the invention provided herein.

BRIEF SUMMARY OF THE INVENTION

New filter elements, filter mounting systems, filter systems, methods of servicing filter systems, and methods of mounting filter elements are provided herein.

In an example, a filter element is provided. The filter element is to be mounted to a mounting yoke extending from a tube sheet. The tube sheet has a flow aperture therethrough. The mounting yoke has a threaded shank. A coupler threadedly attached to the threaded shank secures the filter element to the threaded shank. The coupler includes an angular catch.

The filter element includes a tube of filter media, a first end plate, a tube sheet seal, a compression member, and a first angular catch. The tube of filter media extends axially between a first end and a second end. The tube of filter media defines a central cavity sized to receive the mounting yoke therein. The first end plate acts on the tube of filter media. The first end plate has an end plate aperture therethrough sized to receive the threaded shank of the mounting yoke therethrough. The tube sheet seal is proximate the second end of the tube of filter media for sealing the tube of filter media to the tube sheet and fluidly communicating the central cavity with the flow aperture. The tube sheet seal being axially compressible under a first minimum axial load. The compression member is carried by the first end plate. The compression member includes a compression region being axially compressible under a second minimum axial load, the second minimum axial load being greater than the first minimum axial load. The first angular catch is radially offset from a center of the end plate aperture.

In one example, the first angular catch and the compression region are configured such that the first angular catch and the angular catch of the coupler engage only when at least a desired load has been applied to the tube of filter media by the coupler.

In one example, the compression region of the compression member extends around an aperture through the compression member. The compression region is engageable for application of axial load by an attachment member threadedly attached to a portion of the threaded shank that extends through the end plate aperture and the compression member aperture. However, in some examples, the compression region need not extend entirely around the threaded shank.

In one example, the compression member includes a seal region that engages the threaded shank and seals the threaded shank to the first end plate when mounted thereto preventing fluid bypass through the end plate aperture. The seal region may be integrally formed with the compression region, such as from a single continuous piece of material.

In one example, the first angular catch is angularly fixed to the first end plate. The first angular catch may be provided by the end plate or another structure angularly clocked to the end plate. The first angular catch may be provided by the compression member.

In one example, the first angular catch is radially spaced from the compression region.

In one example, the compression region of the compression member is axially compressible upon application of the second minimum axial load toward the second end independent of the angular catch. In other words, compression of the compression region causes a greater degree of compression/axial deformation to the compression region than to the angular catch that is radially offset from the compression region.

In one example, the angular catch and the compression member are formed as parts of a washer removably attached to the first end plate. A clocking arrangement is provided between the washer and the first end plate for angularly orienting the washer to the first end plate about a central axis of the end plate aperture.

In one example, this can be provided by a portion of the washer that extends through the end plate aperture and the end plate aperture and the portion of the washer have non-circular mating peripheries.

In one example, the angular catch is permanently attached to the first end plate. The first end plate could define the angular catch, such as a molded portion or stamped portion of the first end plate. Alternatively, the angular catch could be a separate component permanently secured to the first end plate.

In one example, the compression member is permanently attached to the first end plate. For example, the compression member could be part of the rest of the end plate, the compression member could be adhesively secured or otherwise bonded (chemically, mechanically, welded) to the first end plate.

The compression member could be captured between various portions of the first end plate.

In one example, the first end plate is permanently attached to the tube of filter media and forms part of or is an end cap attached to the tube of filter media.

In one example, an end plate seal is interposed between the tube of filter media and the first end plate. The first end plate is removable from the tube of filter media and is reusable. The end plate seal may be permanently attached to the tube of filter media, the end first end plate or independent of both the tube of filter media and the first end plate.

In one example, the seal region includes a helical wiper seal on an inner diameter of a compression member aperture extending through the compression member. The helical wiper seal corresponds to threading of the threaded shank (e.g. shape and size).

In one example, the first angular catch is provided by a first washer member attached to the compression member and a second washer member is radially offset from the first washer member. The second washer member covers the compression region and is axially engaged by an attachment member threadedly attached to the threaded shank when mounted to the threaded shank. Loading for mounting the filter element is transferred from the attachment member to the filter element through the second washer member.

In one example, the first and second washer members are more rigid than the compression member.

In one example, the first and second washer members are metal and the compression member is a rubber.

In an example, a filter mounting system is provided. The system includes a filter element. In a preferred example, the filter element is a filter element as outlined above. The filter mounting system includes an attachment member, which may take the form of a handle. The attachment member includes a lever and a coupler. The coupler includes an internally threaded bore extending axially through a body of the coupler from one end of the coupler to the other. The coupler includes a clearance bore extending axially through the body and intersecting with the threaded bore at a non-parallel angle from an axis of the threaded bore. The clearance and threaded bores are configured such that the coupler can be oriented such that the clearance bore extends along an axis of the threaded shank and is received over the threaded shank without the threads in the threaded bore engaging the threads of the threaded shank and interfering with sliding motion of the coupler along the threaded shank. The clearance and threaded bores are configured such that the lever can then be manipulated to pivot the coupler into an angled orientation where the threaded shank extends along the axis of the threaded bore and the threads on the threaded shank engage with the threads on the threaded bore. The lever can then be rotated, e.g. about the threaded shank, to thread the coupler along the threaded shank to secure the filter element.

In some examples, this compresses the compression region and the tube sheet seal.

In one example, the system includes a first angular catch radially offset from a center of the aperture through which the threaded shank extends. The first angular catch is angularly fixed to the first end plate, directly or indirectly. The coupler has a second angular catch radially offset from the axis of the threaded bore. When the coupler applies a desired load to the compression region, the compression region compresses a sufficient amount such that the second angular catch will angularly abut the first angular catch of the filter element and inhibit continued angular motion of the coupler to increase the load applied by the coupler to the filter element. When the coupler applies less than the desired load to the compression region, the second angular catch is axially offset from the first angular catch such that continuous rotation of the coupler will not cause the first angular catch to abut angularly the second angular catch.

In one example, the system includes three first angular catches equally angularly spaced apart such that the coupler need be rotated no more than 120 degrees after reaching the desired load before the second angular catch will engage one of the three first angular catches and inhibit continued rotation of the coupler. This can prevent significant over loading of the filter element.

In one example, the attachment member includes three levers equally angularly spaced apart.

In other examples, one or more catches can be provided and one or more levers can be provided.

In one example, the filter element includes one or more identifiers that identify when sufficient loading has been applied to the filter element. In some examples, this identifier may be a feature molded into or onto the filter element with which the lever of the attachment member will align when sufficient loading is applied. In some examples this identifier is the shape of the filter element itself. For example, in a triangular cross-section filter element, the lever or levers may point directly at one of the corners and not between adjacent corners when the coupler has been properly loaded against the filter element.

In one example, a filter system is provided. The filter system includes a filter mounting system, a filter element, a tube sheet and a mounting yoke. The tube sheet has a flow aperture in fluid communication with the central cavity of the tube of filter media. The mounting yoke extends into the central cavity of the tube of filter media. The mounting yoke includes a threaded shank extending through the end plate aperture. The coupler is threadedly attachable to the threaded shank when the threaded shank is aligned with the threaded bore of the coupler and is axially slidable along the threaded shank when the clearance bore is aligned with the threaded shank. The coupler is rotatable about the threaded shank to increase loading on the filter element and to compress the tube sheet seal against the tube sheet.

In one example, a method of mounting a filter element of a filter system is provided. The method includes mounting the filter element over the mounting yoke with the threaded shank extending through the end plate aperture. The method includes aligning the clearance bore with the threaded shank and sliding the coupler towards the filter element. The method includes pivoting the coupler to engage the threaded bore with the threaded shank. The method includes rotating the coupler to tighten the coupler against the filter element and to compress the housing seal against the tube sheet.

In one example, the method includes rotating the coupler until a desired load is applied from the coupler to the compression region of the compression member and continuing to rotate the coupler until a first angular catch of the filter element angularly abuts a second angular catch of the coupler, if the first and second angular catch are not in angular abutting relationship when the desired load is reached.

In one example, the first and second angular catches are radially offset from a central axis of the threaded shank.

In one example, when the desired load is reached, the coupler sufficiently axially compresses the compression region such that the second angular catch will angularly abut the first angular catch of the filter element and inhibit continued angular motion of the coupler to increase the load applied by the coupler to the filter element. Notably, the first and second angular catches may not immediately angularly abut, but some continued angular rotation of the coupler may be required. When the coupler applies less than the desired load to the compression region, the second angular catch is axially offset from the first angular catch such that continuous rotation of the coupler will not cause the first angular catch to abut angularly the second angular catch.

In one example, a mounting system is provided. The mounting system includes a threaded shank, a seal, and an attachment member. The seal seals a filter element to the threaded shank. The attachment member may be in the form of a handle. The attachment member includes a lever and a coupler. The coupler includes an internally threaded bore extending axially through a body of the coupler from one end of the coupler to the other. The coupler includes a clearance bore extending axially through the body and intersecting with the threaded bore at a non-parallel angle from an axis of the threaded bore. The coupler can be oriented such that the clearance bore extends along an axis of the threaded shank and is received over the threaded shank without the threads in the threaded bore engaging the threads of the threaded shank and interfering with sliding motion of the coupler along the threaded shank. The lever can then be manipulated to pivot the coupler into an angled orientation where the threaded shank extends along the axis of the threaded bore and the threads on the threaded shank engage with the threads on the threaded bore, and the lever can then be rotated to thread the coupler along the threaded shank to compress the seal.

In an example, a mounting system includes a threaded shank, a compression member, a first angular catch and a second attachment member. The compression member has a compression region. The first angular catch is in a fixed angular orientation relative to the threaded shank. The attachment member has a threaded bore engageable with threads of the threaded bore. Rotation of the attachment member can thread the attachment member along the threaded shank and compress the compression region to address loading applied by the attachment member. The attachment member has a second angular catch. The first and second angular catches angularly abut only after the attachment member applies a desired load to the compression region of the compression member. When the attachment member applies less than the desired load to the compression region, the second angular catch is axially offset from the first angular catch such that continuous rotation of the coupler will not cause the first angular catch to abut angularly the second angular catch.

In one example, either three first angular catches or three second angular catches are provided such that no more than 120 degrees of rotation of the attachment member is required after the desired load is reached to angularly abut a first angular catch with a second angular catch.

In an example, a filter system is provided. The system includes a filter element as outlined above. The system includes a threaded shank extending through the end plate aperture in the filter element. An attachment member has a threaded bore engageable with threads of the threaded shank. Rotation of the attachment member can thread the attachment member along the threaded shank and compress the compression region. The attachment member has a second angular catch. The first and second angular catches angularly abutting only after the attachment member applies a desired axial load. Until the attachment member applies the desired axial load, the second angular catch is axially offset from the first angular catch such that continuous rotation of the attachment member will not cause the first angular catch to abut angularly the second angular catch.

In one example, the attachment member includes a coupler having a body. The body of the coupler provides the threaded bore and the second angular catch.

In one example, the attachment member is in the form of a handle. The handle includes a lever and the coupler. The lever is rotationally engaged with the coupler such that the coupler rotates with the lever. The lever may be permanently or removably engaged with the coupler.

In one example, a method of mounting the filter element of the filter system is provided. The method includes mounting the filter element over the mounting yoke with the threaded shank extending through the end plate aperture. The method includes rotating the coupler to tighten the coupler against the filter element and to compress the housing seal against the tube sheet. Rotating coupler includes rotating the coupler until the desired load is reached and the first and second angular catches abut.

In an example, a filter element including a plurality of interconnected panel sections is provided. The plurality of interconnected panel sections form a tubular arrangement surrounding a central cavity. The plurality of interconnected panel sections include at least a first, a second, and a third panel section. Each panel section includes a filter media panel and a filter media panel support member. The filter media panel has an inner surface and an outer surface. The filter media panel extends laterally between first and second sides. The filter media panel support member defines a cavity receiving the filter media panel. The filter media panel support member defines a first wing portion adjacent the first side of the filter media panel and a second wing portion adjacent the second side of the filter media panel. The first wing portion of the first panel section is attached to the second wing portion of the second panel section to interconnect the first panel section to the second panel section.

In one example, for each panel section, the filter media panel support member includes an inner support and an outer support. The inner support is adjacent the inner surface. The inner support includes a first connection region proximate the first side and a second connection region proximate the second side. The outer support is adjacent the outer surface the outer support includes a third connection region proximate the first side and a fourth connection region proximate the second side. The first and third connection regions are secured to one another forming the first wing portion and secure the inner and outer supports to one another. The second and fourth connection regions are secured to one another forming the second wing portion and secure the inner and outer supports to one another. The cavity of the panel section is formed between the inner and outer supports.

In one example, for each panel section, a first portion of the filter media panel extends into the first wing portion and is sandwiched between the first and third connection regions and a second portion of the filter media panel extends into the second wing portion and is sandwiched between the second and fourth connection regions.

In one example, a clip secures the first wing portion of the first panel section to the second wing portion of the second panel section. The clip may be plastically deformable to secure the wing portions to one another.

In one example, the clip is U-shaped.

In one example, for each panel section, one of the first or second connection regions includes an outward extending section extending outward and away from the first side and the other one of the first or second connection regions includes an outward extending intermediate section and an inward extending end section. The inward extending end section is folded over the intermediate section forming a receiving slot therebetween. The outward extending section is received in the receiving slot.

In one example, for each panel section the filter media panel has a flow face extending between the first and second sides and the first and second wing portions extend outward away from the corresponding first and second sides at a non-parallel, non-perpendicular orientation relative to flow face.

In one example, for each panel section, the inner support includes a main panel that is adjacent the inner surface. The first connection region is connected to and extends at an angle relative to the main panel proximate the first side and the second connection region is connected to and extends at an angle relative to the main panel proximate the second side. For each panel section, the outer support includes a main panel that is adjacent the outer surface, a first intermediate side section adjacent the first side that extends inward from the main panel towards the inner support, the third connection region is provided by an end section that extends outward from the first side at an angle relative to the inner surface, a second intermediate side section adjacent the second side that extends inward from the main panel towards the inner support, the fourth connection region is provided by an end section that extends outward from the second side at an angle relative to the inner surface.

In one example, each panel section is generally planar (e.g. has flat front and rear faces that may have a thickness therebetween). The plurality of panel sections is greater than two and the interconnection of the panel sections forms a generally polygonal cross-sectional shape.

In one example, the inner support is a unitary one-piece construction formed from a mesh material permitting air flow therethrough. The outer support is a unitary one-piece construction formed from a mesh material permitting air flow therethrough. Typically, the mesh will have a greater porosity than the porosity of the filter media panel located between the inner and outer supports.

In one example, a first seal member is attached to a first end of the plurality of panel sections. A second seal member is attached to a second end of the plurality of panel sections. The first seal member seals a first end of each filter media panel of the plurality of panel sections and the second seal member seals a second end of each filter media panel of the plurality of panel sections.

In one example, the first and second seal members are molded to the plurality of panel sections with the filter media panels and filter media panel support members being received in the first and second seal members.

In an example, a filter element comprising a tube of filter media and a first seal member is provided. The tube of filter media extends between first and second ends. In some, but not all examples, the tube of filter media may be provided by separate panels of filter media operably attached to one another. In other examples, the tube of filter media could be a continuous piece of filter media. The first seal member is attached to the first end of the tube of filter media. The first seal member is annular. The first seal member includes an annular sealing rib extending axially outward and away from the tube of filter media. The first seal member includes a first annular abutment shoulder extending axially outward and away from the tube of filter media. The first annular abutment shoulder is spaced radially from the annular sealing rib forming a first channel therebetween.

In one example, an outermost end of the first annular abutment shoulder is positioned axially further away from the tube of filter media than an outermost end of the annular sealing rib.

In one example, the first seal member includes a second annular abutment shoulder extending axially outward and away from the tube of filter media. The second annular abutment shoulder is spaced radially from the annular sealing rib forming a second channel therebetween. The annular sealing rib is positioned radially between the first and second annular abutment shoulders.

In one example, the first and second annular abutment shoulders extend axially outward farther than the annular sealing rib such that the outermost end of the annular sealing rib is recessed axially inward relative to the outer most axial ends of the first and second annular abutment shoulders such that the first and second annular abutment shoulders and annular sealing rib form a receiving groove. The annular sealing rib thus provides a bottom of the groove, and the shoulders define a mouth of the groove.

In one example, the axially outermost ends of the first and second shoulders are the axially outermost extent of the first seal member.

In one example, the tube of filter media has a generally polygonal cross-sectional shape in a plane orthogonal to a central axis extending between the first and second ends. The annular sealing rib includes a plurality of straight sides connected by corner regions. A radial thickness of the straight sides is greater than a radial thickness in the corner region. This may be measured perpendicular to the straight sides and in the center of the corner regions.

In one example, an average radial dimension of the outermost end of the first annular abutment shoulder is greater than an average radial dimension of the outermost end of the annular sealing rib.

In one example, a second seal member is attached to the second end of the tube of filter media. The second seal member includes an annular sealing rib; a first annular surface radially outward of the annular sealing rib; and a second annular surface radially inward of the annular sealing rib. The annular sealing rib extends axially outward and away from the tube of filter media and axially outward beyond the first and second annular surfaces.

In one example, the axially outermost extent of the annular sealing rib of the second seal member is the axial outer most extent of the second seal member.

In one example, the first seal member includes a second annular abutment shoulder extending axially outward and away from the tube of filter media. The second annular abutment shoulder is spaced radially from the annular sealing rib forming a first channel therebetween. The axially outermost end of the annular sealing rib is spaced axially outward away from the tube of filter media a greater distance than an axially outermost end of the first annular abutment shoulder. The axially outermost end of the annular sealing rib is spaced axially outward away from the tube of filter media a greater distance than an axially outermost end of the second annular abutment shoulder.

In one example, the first annular abutment shoulder is spaced radially outward of the radially inner edge of the of the filter media of the tube of filter media.

In one example, a radially inward facing surface of the first seal member is tapered at a first angle relative to a central axis of the tube of filter media such that the radially inward facing surface is spaced further from the central axis when moving axially away from the tube of filter media. The tube of filter media is frustoconical and is tapered relative to the central axis at a second angle such that an outer periphery of the tube of filter media increases in radial dimension when moving from the second end towards the first end. The second angle is more parallel to the central axis than the first angle.

In one example, a cross-sectional shape of the tube of filter media is substantially polygonal in shape.

In an example, a filter element including a tube of filter media and a seal member is provided. The tube of filter media extends axially between a first end and a second end. The tube of filter media defines a central cavity. The tube of filter media is frustoconical increasing in radial dimension when moving along a central axis from the second end towards the first end. The tube of filter media extends at a first angle relative to the central axis. The filter media of the tube of filter media has a radially inner most edge at the first end. The seal member is attached to a first end of the tube of filter media. The seal member has a radially inward facing tapered inner surface. The tapered inner surface extends at a second angle relative to the central axis. The first angle is more parallel to the central axis than the second angle.

In one example, the first and second angles are less than 90 degrees.

In one example, an axially outermost extent of the tapered inner surface of the seal member that is spaced axially the furthest from the first end of the tube of filter media is positioned radially outward of the inner most edge at the first end.

In one example, the cross-sectional shape of the tube of filter media and the first seal member is generally polygonal. The polygonal shape of the seal member defines a plurality of straight sides interconnected by a plurality of corner region. The second angle is measured in a portion of the polygonal shape of the seal member defined by a straight side.

In one example, the corner portions of the radially inward facing surface of the seal member extend at a third angle relative to the central axis. The third angle is more parallel to the central axis than the second angle.

In an example, a filter system including a tube sheet and a filter element is provided. The tube sheet defines a flow aperture therethrough. The filter element is mounted to the tube sheet. The filter element includes a tube of filter media defining a central cavity. The tube of filter media extends between first and second ends along a central axis. The first end is adjacent the tube sheet. The filter element includes a first seal member attached to the first end of the tube of filter media. The first seal member is annular and defines a flow opening in fluid communication with the central cavity. The first seal member includes a radially inward facing surface. The radially inward facing surface is tapered at a first angle relative to the central axis of the tube of filter media such that the radially inward facing surface is spaced further from the central axis when moving axially away from the tube of filter media.

In one example, the tube of filter media is frustoconical and is tapered relative to the central axis at a second angle such that an outer periphery of the tube of filter media increases in radial dimension when moving from the second end towards the first end. The second angle is more parallel to the central axis than the first angle.

In one example, the first end of the tube of filter media defines an inner edge. The inner edge is spaced radially inward of a periphery of the flow aperture through the tube sheet.

In one example, the tube of filter media has a plurality of first sides and the flow aperture through the tube sheet has a plurality of second sides. The first and second sides have a same number of sides. Corresponding ones of the first and second sides are parallel. The inner edge of the tube of filter media extends along, at least, the plurality of first sides. The periphery of the flow aperture through the tube sheet extends along, at least in part, the plurality of second sides.

In one example, the radially inward facing surface has a first surface edge spaced axially from the tube of filter media. The first surface edge is spaced radially between the inner edge of the tube of filter media and the periphery of the flow aperture.

In one example, the radially inward facing surface has a second surface edge. The second surface edge being closer to the second end of the tube of filter media than the first surface edge. The second surface edge is spaced radially inward of the first surface edge.

In one example, the first seal member has an axially facing abutment shoulder that faces away from the tube of filter media. The first surface edge is formed at the intersection of the axially facing abutment shoulder and the radially inward facing surface.

In one example, the axially facing abutment shoulder abuts the tube sheet when the filter element is mounted to the tube sheet.

In one example, a filter assembly having a tube of filter media and an end plate is provided. The tube of filter media extends between a first end a second end and defines a central axis extending between the first and second ends. The first end is an open end. The filter media has a thickness measured in the radial direction. The end plate is axially biased towards or operably attached to the tube of filter media and spans the open end. The end plate has an end face. An outer periphery of the end face defines a fairing.

In one example, the fairing is in the form of a surface having a curved profile.

In one example, the curved profile has a first portion that is more tangential to a plane that is generally orthogonal to the central axis and a second portion that is axially closer to the tube of filter media that is less tangential to the plane.

In one example, the curved profile is substantially at least a quarter round profile.

In one example, the second portion is substantially tangential to a second plane that is generally orthogonal to the first plane. The second portion is a radially outermost extent of the end plate.

In one example, the fairing is generally annular and surrounds an axial recess in the end plate. A through hole extends axially through the end plate within the axial recess.

In one example, the end plate is unitarily formed with the tube of filter media such that the end plate cannot be removed from the tube of filter media without destroying either or both of the end plate or the tube of filter media.

In one example, the end plate is removable from the tube of filter media and reusable with a new tube of filter media. A seal may be carried by the tube of filter media that seals with the end plate.

In one example, a radial dimension of the curved profile of the fairing is at least 25% a radial dimension of a wall thickness of the tube of filter media. An axial dimension of the curved profile of the fairing is at least 25% of the radial dimension of the wall thickness of the tube of filter media.

In one example, the radius of curvature of the curved profile is at least 25% of the shortest distance between the side of the end plate and the centroid of the end plate, and more preferably at least 30% of this distance.

In one example, the curved profile extends radially outward to the upper most outer edge of the panel section of the end plate and radially inward by a radial dimension that is at least 25% of the shortest distance between the edge of the end plate 130 and its centroid, more preferably at least 30% of this distance.

In one example, the tube of filter media has a polygonal cross-sectional shape.

In one example, a filter assembly including a tube of filter media and an end plate is provided. The tube of filter media extends between a first end a second end and defines a central axis extending between the first and second ends. The first end is an open end. The filter media has a thickness measured in the radial direction. The end plate is axially biased towards or attached to the tube of filter media and spans the open end. The end plate has a mounting aperture extending axially therethrough. The mounting aperture is radially offset from a center of the end plate.

In one example, the end plate has a generally polygonal cross-sectional peripheral shape in a plane generally orthogonal to the central axis. The polygonal shape is formed by a plurality of generally straight sides connected by a plurality of corners. The mounting aperture is located along an axis that generally bisects one of the corners and that extends through the center of the end plate.

In one example, the end plate has a generally triangular peripheral shape in a plane generally orthogonal to the central axis. The triangular shape is formed by a plurality of sides connected by a plurality of corners. The center of the end plate is defined by a center of a circle defined by the corners.

In one example, the triangular peripheral shape is an equilateral triangle. The mounting aperture is offset toward one of the plurality of corners from the center of the end plate along an axis that extends through the center of the end plate and that bisects the corner towards which the mounting aperture is offset.

In one example, a seal member is attached to the first end of the tube of filter media. The end plate is attached to or biased against the second end of the tube of filter media. The end plate has a generally triangular peripheral shape in a plane generally orthogonal to the central axis. The triangular shape is formed by a plurality of sides connected by a plurality of corners. The center of the end plate is defined by a center of a circle defined by the corners. The seal member has a generally triangular peripheral shape in a plane generally orthogonal to the central axis. The triangular shape is formed by a plurality of sides connected by a plurality of corners. A center of the seal member is defined by a center of a circle defined by the corners. The center of the end plate is coaxial with the center of the seal member and the central axis when the end plate is biased against the tube of filter media or attached to the tube of filter media.

In one example, the tube of filter media is generally frustoconical and is larger in dimension at the first end than at the second end.

In an example, a filter system including a tube sheet and a mounting yoke is provided. The tube sheet defines a flow aperture therethrough. The tube sheet is configured to be oriented in a vertical orientation. The mounting yoke extends outward from the tube sheet in a generally cantilevered orientation. The mounting yoke includes first, second, and third legs and a mounting shank. The first leg has a first end mounted to the tube sheet at a first mounting location and a second end. The second leg has a first end mounted to the tube sheet at a second mounting location and a second end. The third leg has a first end mounted to the tube sheet at a third mounting location and a second end. The first, second and third mounting locations define a circle. The mounting shank is operably connected to the second ends of the first, second and third legs. The mounting shank extends along a mounting axis that is generally orthogonal to the tube sheet and that extends through the flow aperture. The mounting axis does not pass through the center of the circle defined by the first, second and third mounting locations.

In one example, the first mounting location is vertically above the second and third mounting locations. The second mounting location is vertically between the first and third mounting locations and is horizontally spaced from the first and third mounting locations.

In one example, the mounting shank is located, at least in part, vertically above the second mounting location.

In one example, the first and third mounting locations are coaxial on an axis that is parallel to gravity.

In one example, the mounting shank is located horizontally closer to the axis that extends through the first and third mounting locations than the center of the circle.

In one example, the first leg has a first portion that is substantially straight that is proximate the tube sheet and a first bend interposed between the first portion and the mounting shank. The straight portion and first bend are coplanar. The second leg has a first portion that is substantially straight that is proximate the tube sheet and first and second bends. At least one of the first and second bends is non-coplanar with the first portion and the other one of the first and second bends. The third leg has a first portion that is substantially straight that is proximate the tube sheet and first and second bends. At least one of the first and second bends is non-coplanar with the first portion and the other one of the first and second bends.

In one example, the mounting axis of the mounting shank is offset from the center of the circle towards the first leg.

In one example, the mounting axis is within a plane defined by the first mounting location, the center of the circle and that is orthogonal to the tube sheet.

In one example, a filter element is provided that has a tube sheet seal that axially seals against the tube sheet when the filter element is mounted to the mounting shank of the mounting yoke. The tube sheet seal has a generally polygonal shape that includes at least a first corner receiving the first leg, a second corner receiving the second leg, and a third corner receiving the third leg.

In one example, a filter element is provided. The filter element has a tube of filter media. The tube of media defines a cavity that receives the mounting yoke in a mounted state. An end plate is biased against or attached to the tube of filter media. The end plate has a mounting aperture extending therethrough and receiving the mounting shank when in a mounted state.

In one example, the end plate has a geometric center that is offset from a center of the mounting aperture.

In one example, the geometric center is coaxial with the center of the circle along an axis that is orthogonal to the tube sheet.

In one example, the mounting locations define a triangle. The tube sheet seal has a cross-sectional shape that is a similarly shaped triangle. When mounted, the mounting aperture is positioned vertically above and horizontally offset from a geometric center of the triangle defined by the cross-sectional shape of the tube sheet seal.

In one example, the end plate has a generally triangular peripheral shape in a plane generally orthogonal to the central axis. The triangular shape is formed by first, second and third sides connected by first, second and third corners. A center of the end plate is defined by a center of a circle defined by the first, second and third corners. The mounting aperture is offset from the center of the end plate.

In one example, the mounting aperture is offset toward the first corner from the center of the end plate along an axis that extends through the center of the end plate and that bisects the first corner.

In one example, when mounted, the first corner is directly vertically offset above the third corner with the first side extending between the first and third corners. The first side is vertically oriented and generally parallel with gravity. The second corner is vertically interposed between the first and third corners but is laterally offset from the first and third corners as well as laterally offset from the first side.

In one example, the mounting aperture is offset from the center of the end plate laterally towards the first side and laterally away from the second corner. The mounting aperture is offset from the center of the end plate vertically upward.

In one example, a filter element is provided. The filter element is for use in a filter system including a tube sheet defining a flow aperture therethrough. The tube sheet is configured to be oriented in a vertical orientation. A mounting yoke extends outward from the tube sheet in a generally cantilevered orientation. The mounting yoke includes first, second and third mounting legs mounted at first, second, and third mounting locations, respectively, that define a circle. The mounting yoke includes a mounting shank that is operably connected to second ends of the first, second and third legs. The mounting shank extends along a mounting axis that is generally orthogonal to the tube sheet and that extends through the flow aperture but that does not pass through the center of the circle. The filter element includes a tube of filter media. The filter element includes a tube sheet seal operably attached to the tube of filter media. The tube sheet seal axially seals against the tube sheet when mounted to the mounting shank of the mounting yoke. The tube sheet seal has a generally polygonal shape that includes at least a first corner receiving the first leg, a second corner receiving the second leg, and a third corner receiving the third leg so as to orient the tube sheet seal and tube of filter media relative to the mounting yoke and the flow aperture.

In an example, a filter element is provided. The filter element includes first and second filter element sections. The first filter element section includes a first tube of filter media extending between first and second ends. A first seal member is attached to the first tube of filter media. The first seal member is annular. The first seal member includes a first annular sealing rib extending axially outward and away from the first tube of filter media. The first seal member includes a first annular abutment shoulder extending axially outward and away from the first tube of filter media. The first seal member includes a second annular abutment shoulder extending axially outward and away from the first tube of filter media. The first and second annular abutment shoulders extend axially outward relative to the first tube of filter media a greater distance than the first annular sealing rib. The first annular sealing rib is located radially between the first and second annular shoulders. The second filter element section includes a second tube of filter media extending between first and second ends. The second filter element section includes a second seal member attached to the second tube of filter media. The second seal member includes a second annular sealing rib extending axially outward and away from the second tube of filter media. The second seal member includes a third annular abutment shoulder extending axially outward and away from the second tube of filter media. The second seal member includes a fourth annular abutment shoulder extending axially outward and away from the second tube of filter media. The second annular sealing rib extends axially outward relative to the second tube of filter media a greater distance than the third and fourth annular abutment shoulders. The second annular sealing rib is located radially between the third and fourth annular shoulders. The second annular sealing rib is axially received between the first and second annular shoulders and into axial abutment with the first annular sealing rib.

In one example, the first seal member is annular bounding an opening therethrough. The second seal member is annular bounding an opening therethrough. The first cavity defined by the first tube of filter media is fluidly communicated with a second cavity defined by the second tube of filter media through the openings of the first and second seal members such that the first and second cavities form a continuous cavity.

In one example, the first, second, third and fourth abutment shoulders and the first and second sealing ribs are configured such that for the first and third abutment shoulders to axially abut and the second and fourth abutment shoulders to axially abut, one or both of the first or second annular sealing ribs must be axially compressed.

In an example a filter element including a first filter element section and a second filter element section is provided. The first filter element section has a first tube of filter media extending between first and second ends. A first seal member is attached to the first tube of filter media. The first seal member is annular. The first seal member includes a first annular sealing rib extending axially outward and away from the first tube of filter media and having an axial outermost end. The first seal member includes a first annular abutment shoulder extending axially outward and away from the first tube of filter media and having an axial outermost end. The first seal member includes a second annular abutment shoulder extending axially outward and away from the first tube of filter media and having an axial outermost end. The axial outermost ends of the first and second annular abutment shoulders are positioned axially farther from the first tube of filter media than the axial outermost end of first annular sealing rib. The first annular sealing rib is located radially between the first and second annular shoulders. The second filter element section has a second tube of filter media extending between first and second ends. A second seal member is attached to the second tube of filter media. The second seal member includes a second annular sealing rib extending axially outward and away from the second tube of filter media and having an axial outermost end. The second seal member includes a third annular abutment shoulder extending axially outward and away from the second tube of filter media. The second seal member includes a fourth annular abutment shoulder extending axially outward and away from the second tube of filter media and having an axial outermost end. The axial outermost ends of the third and fourth annular abutment shoulders are positioned closer to the second tube of filter media than the axial outermost end of second annular sealing rib. The second annular sealing rib is located radially between the third and fourth annular shoulders. The second annular sealing rib is axially received between the first and second annular abutment shoulders and into axial abutment with the first annular sealing rib.

In one example, the first, second, third and fourth abutment shoulders and the first and second sealing ribs are configured such that for the first and third abutment shoulders to axially abut and the second and fourth abutment shoulders to axially abut, one or both of the first or second annular sealing ribs must be axially compressed.

In an example, an end plate for mounting a filter element to a yoke of a tube sheet is provided. The filter element has a seal member defining an aperture to central cavity of the filter element. The end plate includes a main body having an outward facing surface. The main body has a mounting aperture through which a portion of the yoke extends when mounted. The end plate includes an annular sealing rib extending axially outward from the outward extending face. The annular sealing rib extends around the mounting aperture.

In one example, the main body includes a first component and a second component. The second component provides the annular sealing rib and the outward facing surface. The outward facing surface has a radially inner edge and a radially outer edge defined by the second component. The annular sealing rib is laterally spaced away from at least one of the inner and outer edges such that a portion of the outward facing surface is positioned between the at least one of the inner and outer edges and the annular sealing rib.

In one example, the annular sealing rib is spaced laterally away from both of the inner and outer edges such that a first portion of the outward facing surface is positioned between the inner edge and the annular sealing rib and a second portion of the outward facing surface is positioned between the outer edge and the annular sealing rib.

In one example, the second component is formed from a material that is less rigid than the first component.

In one example, the mounting aperture is offset from a geometrical center of the outward extending face.

In one example, a portion of the first component extends axially into the annular sealing rib to provide increased rigidity to the annular sealing rib.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
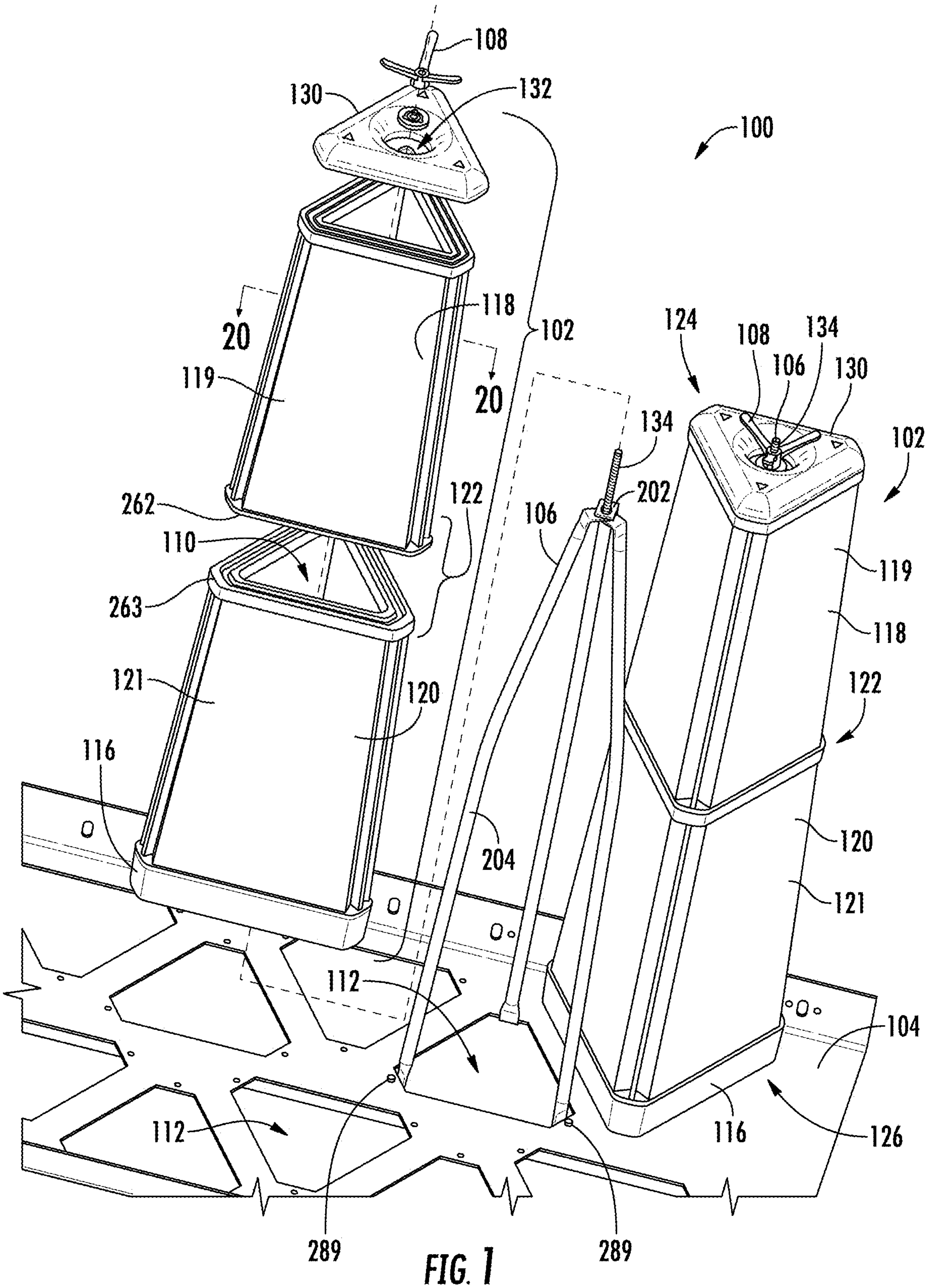
FIG. 1 is a partial perspective illustration of a filter system according to an example of the disclosure with one filter element in a mounted state and one filter element in a removed and exploded state.

FIG. 1 partially illustrates a filtration system 100 according to a first example of the disclosure. The filtration system 100 finds particular use in high volume air filtration systems, such as in a filter house that may form the intake for a gas turbine engine. The system includes a plurality of filter elements 102 mounted to a mounting arrangement illustrated in the form of a tube sheet 104. Mounting yokes 106 (one illustrated in full detail in FIG. 1) are attached to or proximate the tube sheet 104 to secure the filter element 102 to the tube sheet 104. Attachment members, illustrated in the form of threaded handles 108, secure filter elements 102 to corresponding mounting yokes 106.

While only two filter elements 102 are illustrated, these systems will typically have many if not hundreds of filter elements 102. As such, minor improvements associated with each filter element can provide significant advantages for the overall system (e.g. improved filtration, reduced pressure drop, improved sealing or improved maintenance efficiency).

In general, the filter elements 102 are tubular defining internal cavities. When mounted, internal cavities 110 defined by the filter elements 102 are in fluid communication with flow apertures 112 extending through the tube sheet 104. A tube sheet seal 116 of the filter element 102 seals the internal cavity of the filter element 102 to the tube sheet to prevent fluid bypass between the filter element 102 and the tube sheet 104.

In the illustrated example, each filter element 102 includes a pair of filter element sections 118, 120 in a stacked orientation. Each filter element section 118, 120 includes a section of filter media 119, 121 through which dirty fluid will flow to remove particulates and/or other impurities entrained in the fluid to be filtered. In this example, the sections of filter media 119, 121 form tubes of filter media that are generally triangular in cross-section. The tubes are also generally frusto-conical such that they narrow in dimension when moving from the second end 126 toward the first end 124, e.g. away from the tube sheet 104.

In other embodiments, the tubes need not be frusto-conical and could have a constant cross-section their entire length. Further, in other embodiments, the filter element 102 could be formed from a single section. Further, other cross-sectional shapes are contemplated.

Figure 20:
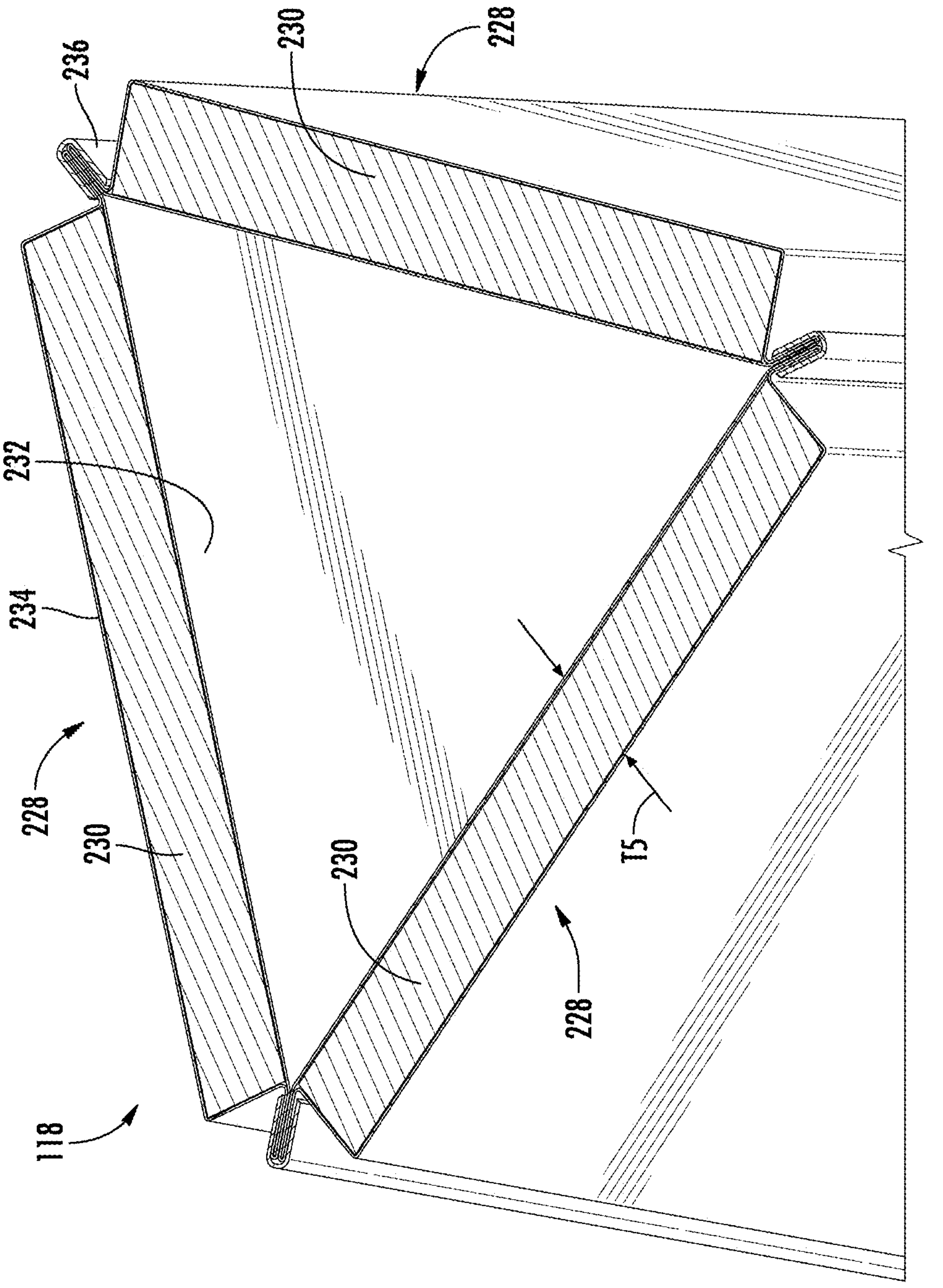
FIG. 20 is an end view of a plurality of panel portions of a tube of filter media.

The filter element sections 118, 120 are formed from a plurality of separate filter media panels combined to form a generally triangular cross-section when viewed in a plane orthogonal to a central axis of the filter element sections 118, 120 and the frusto-conical tube. FIG. 20 is a cross-sectional illustration through filter element sections 118. As illustrated, the filter element section 118 includes three separate panel sections 228 that are interconnected to one another. The panel sections 228 are generally flat panels that have a trapezoidal outer periphery. The trapezoidal outer periphery may be viewed in FIG. 1. Typically, the trapezoidal outer periphery is an isosceles trapezoid with the parallel sides being generally parallel to the tube sheet and proximate corresponding seal members.

Figure 21:
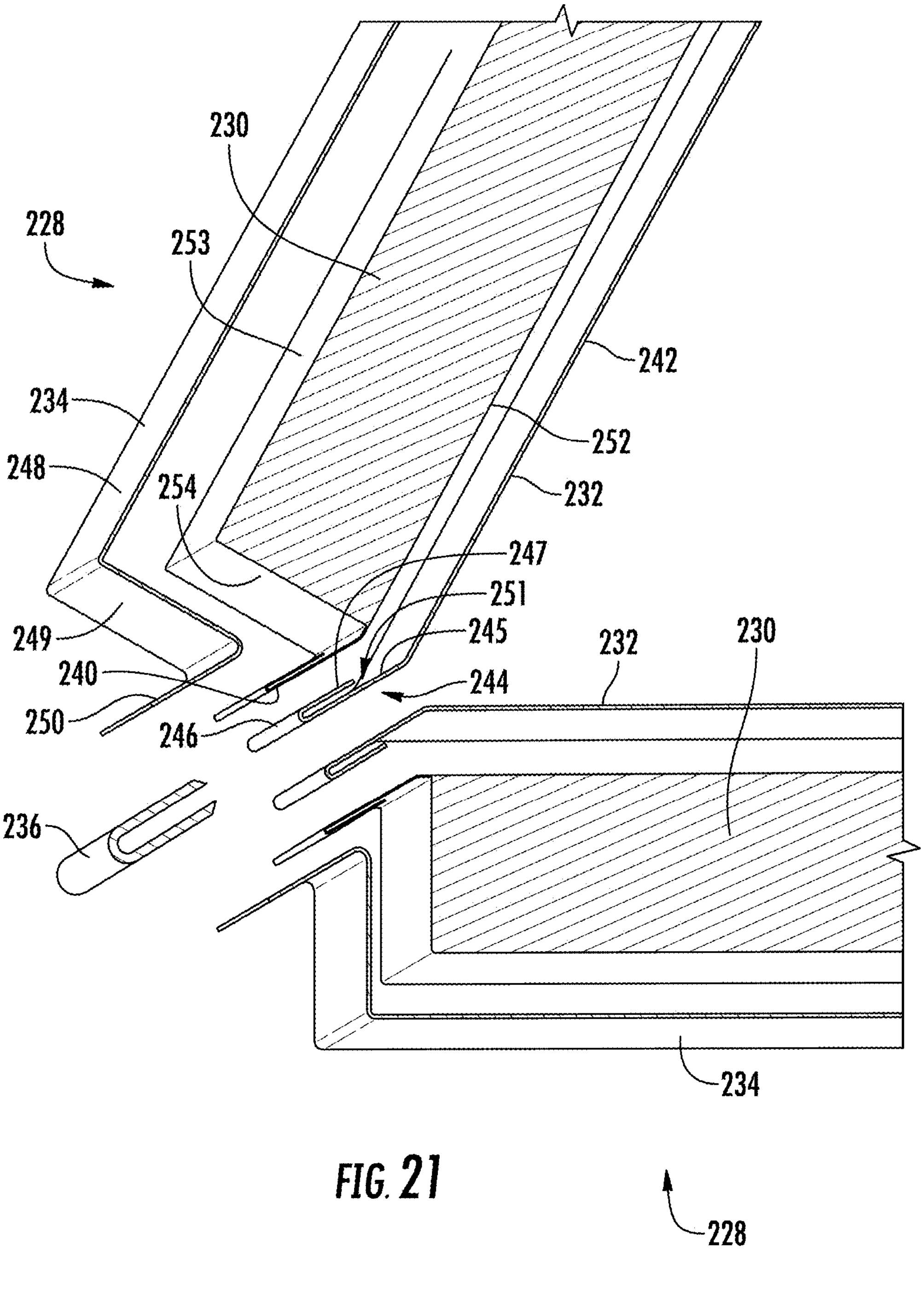
FIG. 21 is an exploded illustration of the panel portions of FIG. 20.

With reference to FIGS. 20 and 21, each panel section 228 includes a filter media panel 230 and a filter media panel support member that includes inner and outer mesh supports 232, 234. A clip in the form u-shaped connector 236 secures wing portions of adjacent panel sections 228 to one another.

Figure 22:
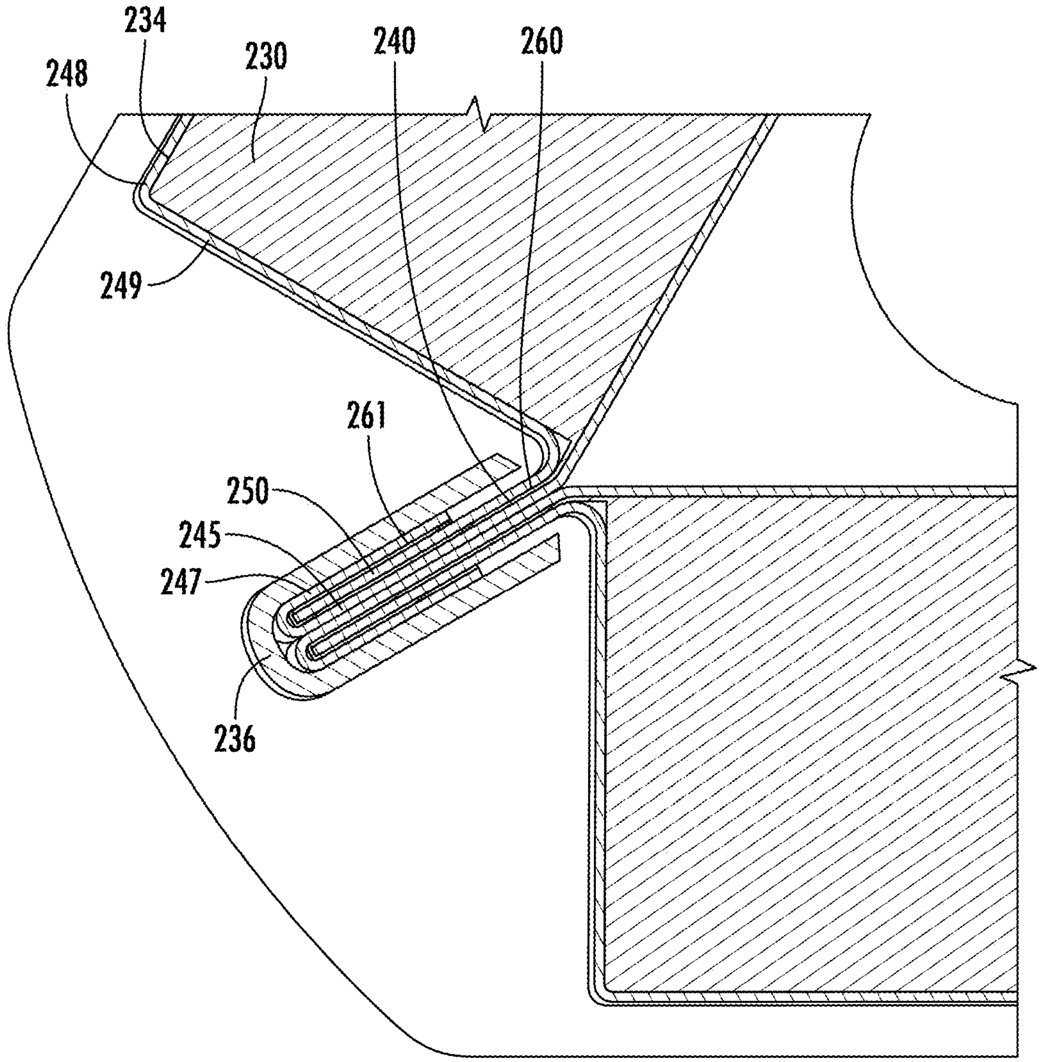
FIG. 22 is an enlarged cross-sectional illustration illustrating the connection of two panel portions of the tube of filter media of FIG. 20.

With reference to FIGS. 21 and 22, the inner and outer mesh supports 232, 234 are interfolded with one another as well as a portion 240 of the pleated filter media to secure the portions of a panel section 228 together into a single unit. The interfolding of the filter media in the wing portions also provides improved sealing between the adjacent panel sections 228.

In the illustrated example, the interfolded portions of a panel section 228 form the wing portions of each panel section 228. It is these wing portions of adjacent panel sections 228 that are then clipped or secured together using clip 236 to form the tubular filter element 102.

FIG. 21 is partial illustration of two exploded panel sections 228 and FIG. 22 illustrates two panel sections 228 after final assembly.

The inner and outer mesh supports 232, 234 wrap around to protect and support the filter media panel 230. Each side (e.g. wing portion) of each panel section 228 is a mirror image of one another so only one side (e.g. wing portion) need be described.

In this example, the inner mesh support 232 includes a main panel 242 and a connection region 244 that includes an intermediate section 245, a bend 246 and an end section 247. The intermediate section 245 extends at an angle to main panel 242 and end section 247 folds back over the intermediate section 245 by way of bend 246. This forms a receiving slot 251 between the intermediate section 245 and the end section 247.

The outer mesh support 234 has a main panel 248, an intermediate side section 249 and an end section 250. The intermediate side section 249 extends adjacent a side of the filter media panel towards the inner mesh support 232. The end section 250 extends outward from the side of the filter media and relative to the main panel 242 of the inner mesh support 232 at an angle. The end section 250 forms a connection region of the outer mesh support 234.

When assembled, the connection region of the outer mesh support 234 cooperates with the connection region 244 of the inner mesh support 232 to secure the inner and outer mesh supports 232, 234 to one another. The end section 250 of the outer mesh support 234 is received in the receiving slot 251 of the inner mesh support 232.

Main panel 242 is proximate an inner surface 252 of filter media panel 230 and main panel 248 is proximate an outer surface 253 of filter media panel 230. The main panels 242, 248 and inner and outer surfaces 252, 253 of the filter media 230 are generally parallel.

The intermediate side section 249 of the outer mesh support 234 is proximate a side surface 254 that extends between the inner and outer surfaces 252, 253 of the filter media panel 230, typically, but not necessarily, in perpendicular fashion. The side surface 254 and intermediate side section 249 are generally parallel to one another.

When assembled, intermediate section 245, end section 247 and end section 250 are generally parallel to one another. The end section 247 and end section 250 generally extend at a same angle relative to main panel 242 and inner surface 252.

With reference to FIG. 22, a first section 260 of the end portion 240 of the filter media panel 230 is captured between intermediate section 245 and end section 247 while a second section 261 of the end portion 240 is captured between end section 247 and end section 250.

Once each panel section 228 is formed, adjacent panel sections 228 are interconnected. To do this, the intermediate sections 245 of the inner mesh support 232 of each adjacent panel section 228 are positioned adjacent one another and the u-shaped connector 236 is installed to secure the folded over regions of the panel sections 228 to one another. The u-shaped connector may be crimped and plastically deformed to secure the components to one another.

In some embodiments, a sealing material may be provided between the adjacent wing portions and particularly between intermediate sections 245. The sealing material may be in the form of an adhesive. For example, hot melt or urethane, such as foamed urethane may be employed. Further yet, sealing material may be applied between the filter media and the inner and outer mesh supports 232, 234, such as between the wing portions of the panel sections 228 and the end portions 240 of the filter media. The addition of the seal material prevents or reduces leak paths.

The overlapping portions of the panel sections 228 as well as u-shaped connector provide axial rigidity to the corresponding filter element section 118, 120. The positioning of the connector 236 as well as portions of the mesh supports 232, 234 provide a high stiffness-to-weight ratio, which prevents the need for standalone structural members to accommodate the axial compression forces required for mounting and/or sealing to the tube sheet 104.

Once the panel section sections 228 are interconnected, various seals or other components forming the ends of the filter element sections 118, 120 may be attached or molded thereto.

In some embodiments, the mesh supports 232, 234 are formed from steel mesh. The u-shaped connector 236 may be formed from extruded metal and particularly extruded steel.

Figure 13:
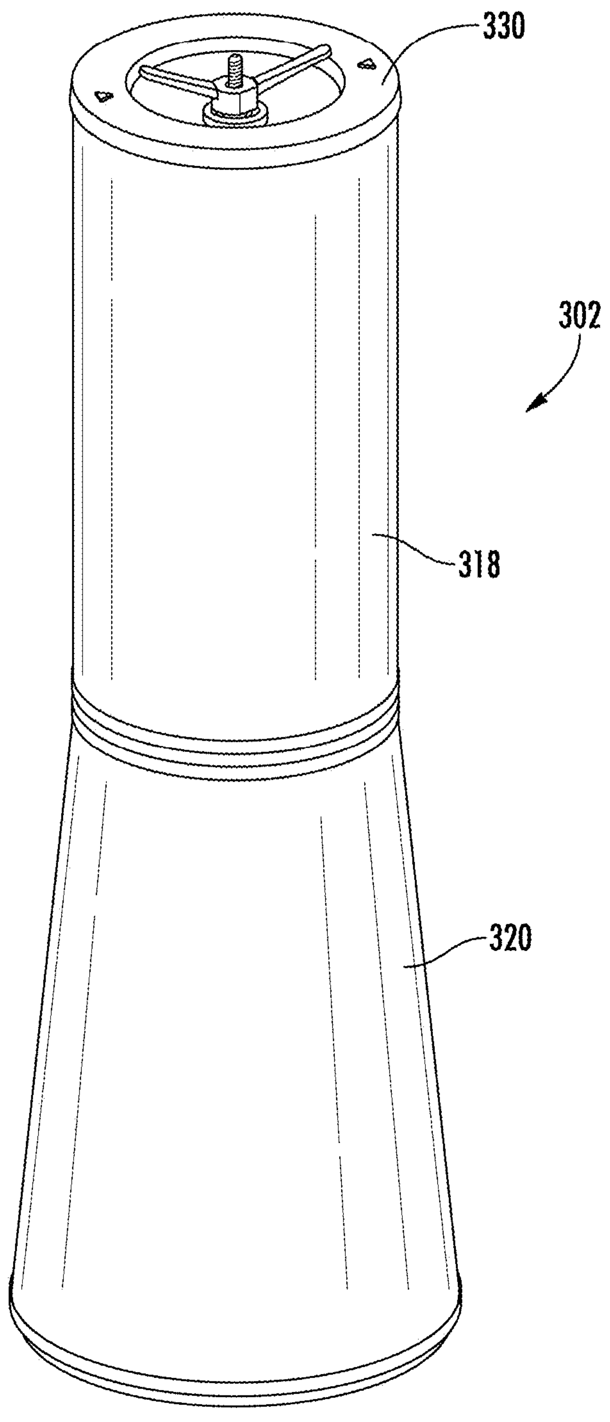
FIG. 13 is a perspective illustration of another example of a filter element and handle.

Further, other cross-sectional shapes are contemplated such as circular, rectangle, etc. Some particular benefits may be provided for some shapes that are not provided for other shapes. In FIG. 13, a filter element 302 is provided with filter element sections 318, 320 having circular cross-sectional shapes. The first filter element section 318 has a constant outer diameter from one end to the other while the second filter element section 320 has a frusto-conical configuration.

Figure 23:
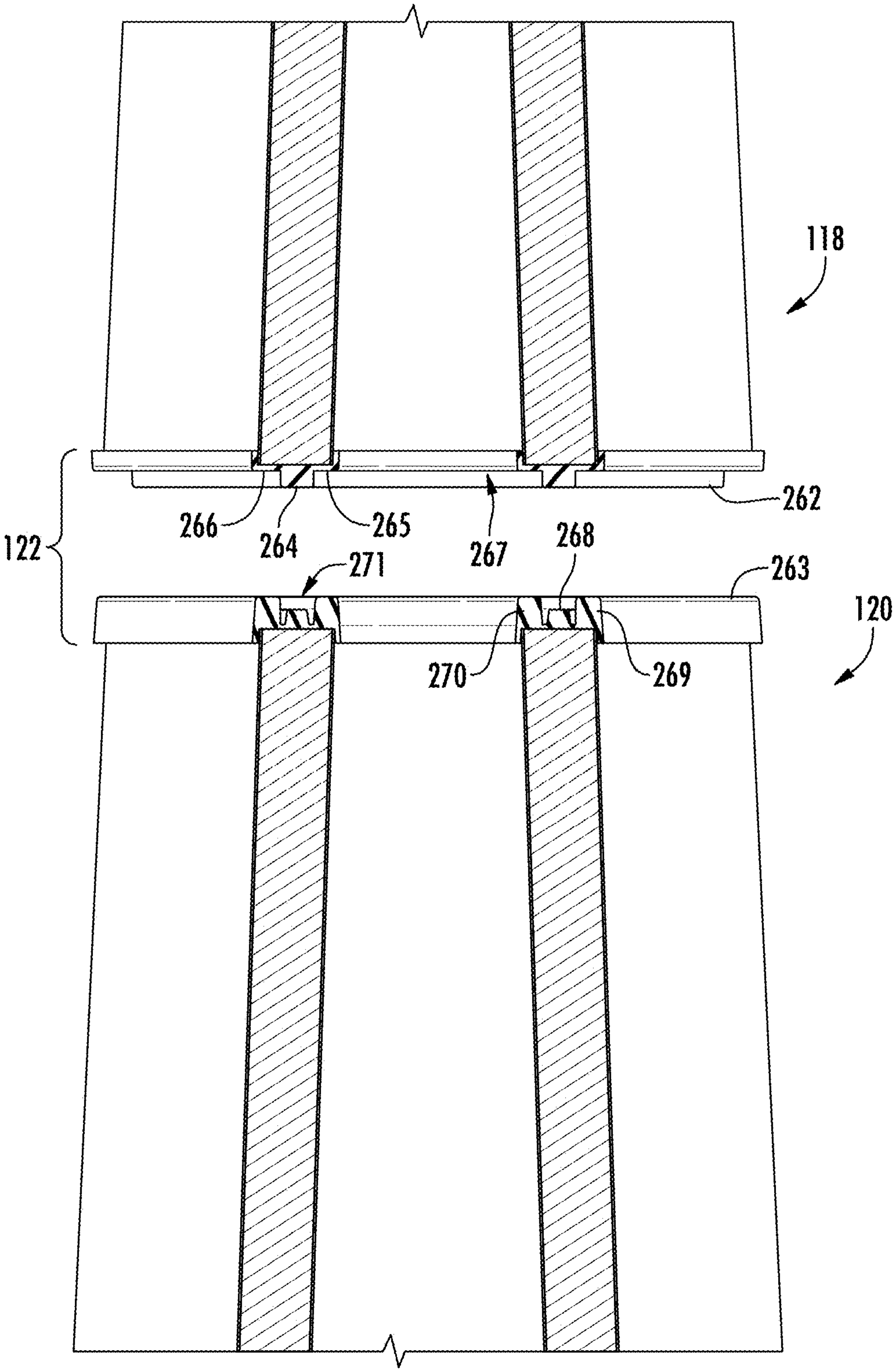
FIG. 23 is an exploded and cross-sectional illustration of two frusto-conical filter element sections illustrating mating sealing features thereof.

With reference to FIGS. 1 and 23, a mating seal arrangement 122 is provided between the stacked filter element sections 118, 120 to prevent fluid bypass. While not required, in some examples, clocking features are provided to properly angularly orient the stacked filter element sections 118, 120 and/or prevent relative angular motion therebetween. In this example, the clocking features are incorporated into the shape and profile of the mating components of the mating seal arrangement 122.

Further yet, in other embodiments, the stacked filter element sections may be clocked directly to the tube sheet 104. For example, mating projections and recesses provided by the filter element section 120 and/or the tube sheet 104 could be provided. Further, non-circular shapes of the filter element could be used in conjunction with projections or recesses formed in the tube sheet 104 for clocking purposes. A separate clocking adaptor could be attached to the tube sheet 104 or the mounting yoke 106 for clocking of the filter element sections 118, 120. It is contemplated that round filter element sections 118, 120 could be clocked as well. In such an instance, the clocking features could be provided on the axial ends or project radially outward from the associated seals or endcaps (if provided).

Further, the triangular shape of the mounting yoke 106 also clocks the filter elements 102 relative to the tube sheet 104 and mounting yoke 106 in the illustrated example.

While this example illustrates stacked filter element sections 118, 120, other filter elements may incorporate only a single section or more than two sections.

The filter elements 102 extend longitudinally between first and second ends 124, 126. One end is provided by each of the filter element sections 118, 120 in this example.

Figure 2:
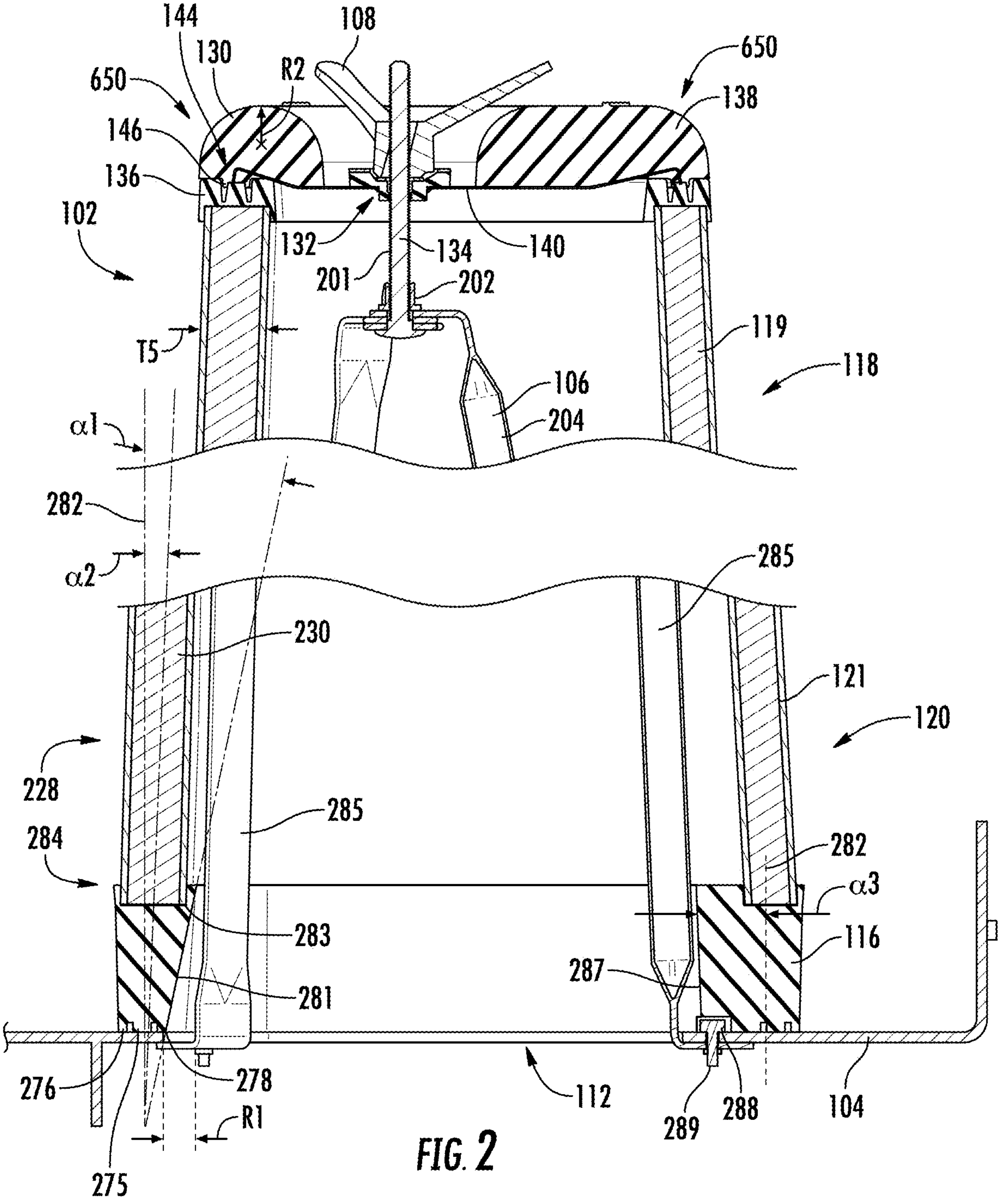
FIG. 2 is a partial cross-sectional illustration of the system of FIG. 1.

With reference to FIGS. 1 and 2, at the first end 124, an end plate 130 is provided. The end plate 130 includes an end plate aperture 132 (also referred to herein as a "mounting aperture"). A threaded shank 134 of the mounting yoke 106 operably extends through the end plate 130 and particularly end plate aperture 132 when the filter element 102 is mounted.

The end plate 130 in this example is reusable and is not permanently attached to the filter element 102 (e.g. permanently attached to either filter element section 118 or 120). In other words, either filter element 102 or the end plate 130 is not damaged when the two components are separated. Instead, an end plate seal 136 is provided by first filter element section 118 and cooperates with the end plate 130 so that the end plate 130 is removably sealed to the first filter element section 118 when the filter element 102 is mounted.

Figure 14:
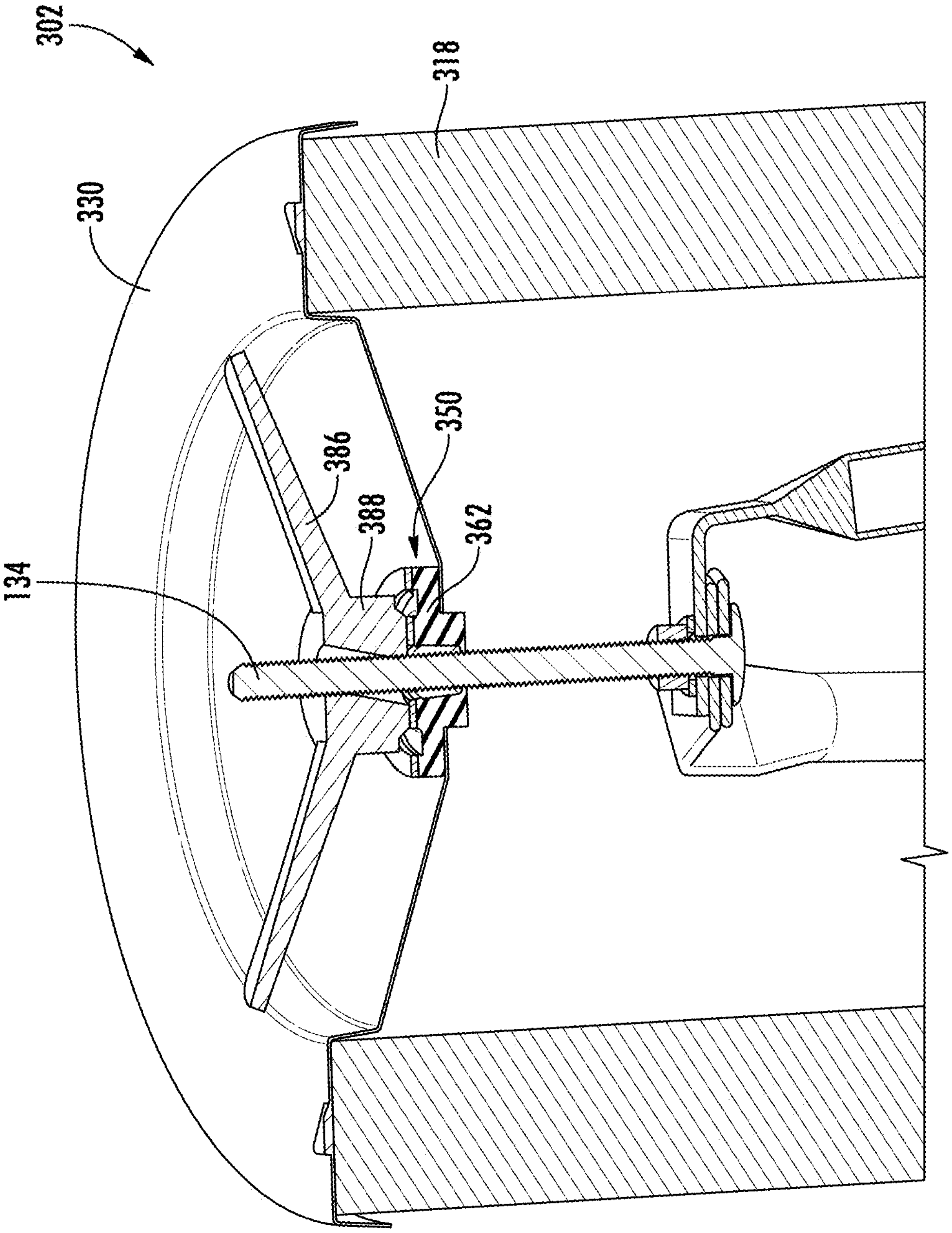
FIG. 14 is a partial cross-sectional illustration of FIG. 13.

With reference to FIGS. 13 and 14, in other embodiments, the end plate 330 may be permanently attached to the filter media of the filter element 302. For example, the end plate 330 could be permanently attached to the filter media of first filter element section 318 and the end plate can form an end cap for that end of the first filter element section 318.

Figure 7:
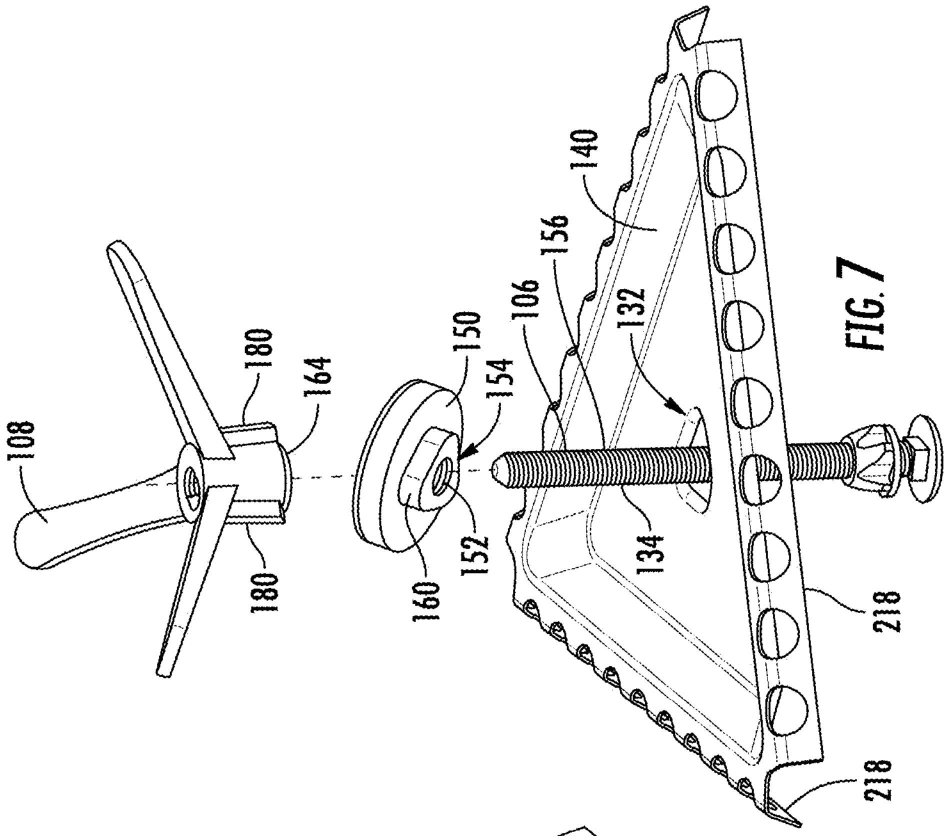
FIGS. 6 and 7 are exploded illustrations of a handle, a washer assembly, a mounting shank and an end plate of the filter system of FIG. 1 forming a filter mounting system of the filter system of FIG. 1.
Figure 6:
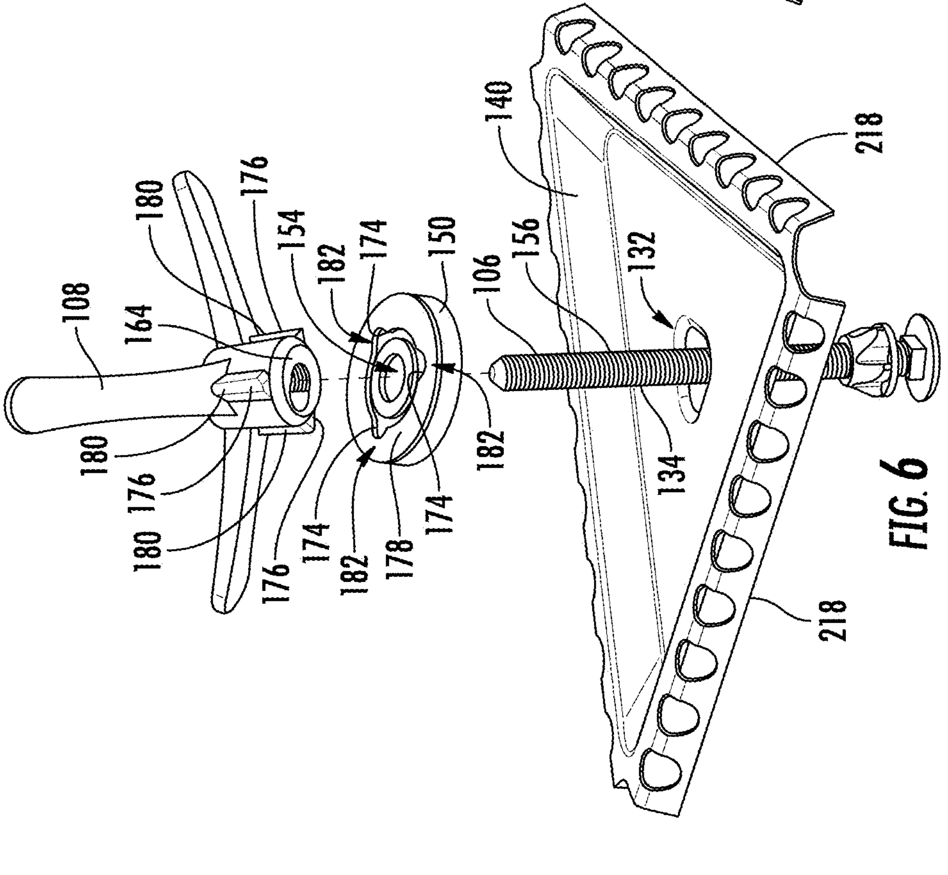

With reference to FIG. 2 and the embodiment therein, the end plate 130 is formed from a plurality of components. The end plate 130 includes an outer shell 138 and an inner plate 140. The inner plate 140 is partially embedded in the outer shell 138. The outer shell 138 may be molded to the inner plate 140. The inner plate 140 optionally includes through holes (see e.g. FIGS. 6 and 7) to allow material of the outer shell 138 to pass therethrough during molding of the outer shell 138 to the inner plate 140 and improve engagement therebetween. In some instances, the outer shell is a urethane and is molded in a molten state. In some embodiments, the end plate 130 is a single piece continuous component.

In an example, the inner plate 140 is formed from metal, such as stamped metal while the outer shell 138 is formed from plastic or rubber. In one example, the outer shell may be formed from polyurethane. However, in other arrangements, the outer shell 138 or inner plate 140 may be formed from plastics. Further yet, in some arrangements, the outer shell 138 is entirely eliminated and only the inner plate 140 is provided.

In some examples, the end plate seal 136 could be formed by the outer shell 138 or the end plate. In further examples, the end plate seal 136 may be entirely independent of the end plate 130 or the filter element 102.

In this example, the inner plate 140 provides increased rigidity to the end plate 130 and allows for transmitting axial loading provided by the handle 108 to the filter element sections 118, 120 to press the tube sheet seal 116 against a sealing surface of the tube sheet 104 surrounding flow aperture 112. This force can also compress other axial seals within the arrangement.

Clocking features between the end plate 130 and the first filter element section 118 are provided. In this example, the clocking features are provided by a mating groove 144 and projection 146 provided by end plate 130 (e.g. outer shell 138) and end plate seal 136 (see also FIG. 18 for these features). These components could be flipped in other embodiments. Further, other clocking features could be provided such as a plurality of separate projections and recesses that can be provided either or both of the mating components. Further yet, the general shape of the filter element (e.g. the triangular periphery in this example) could be used to clock the components relative to one another.

Figure 18:
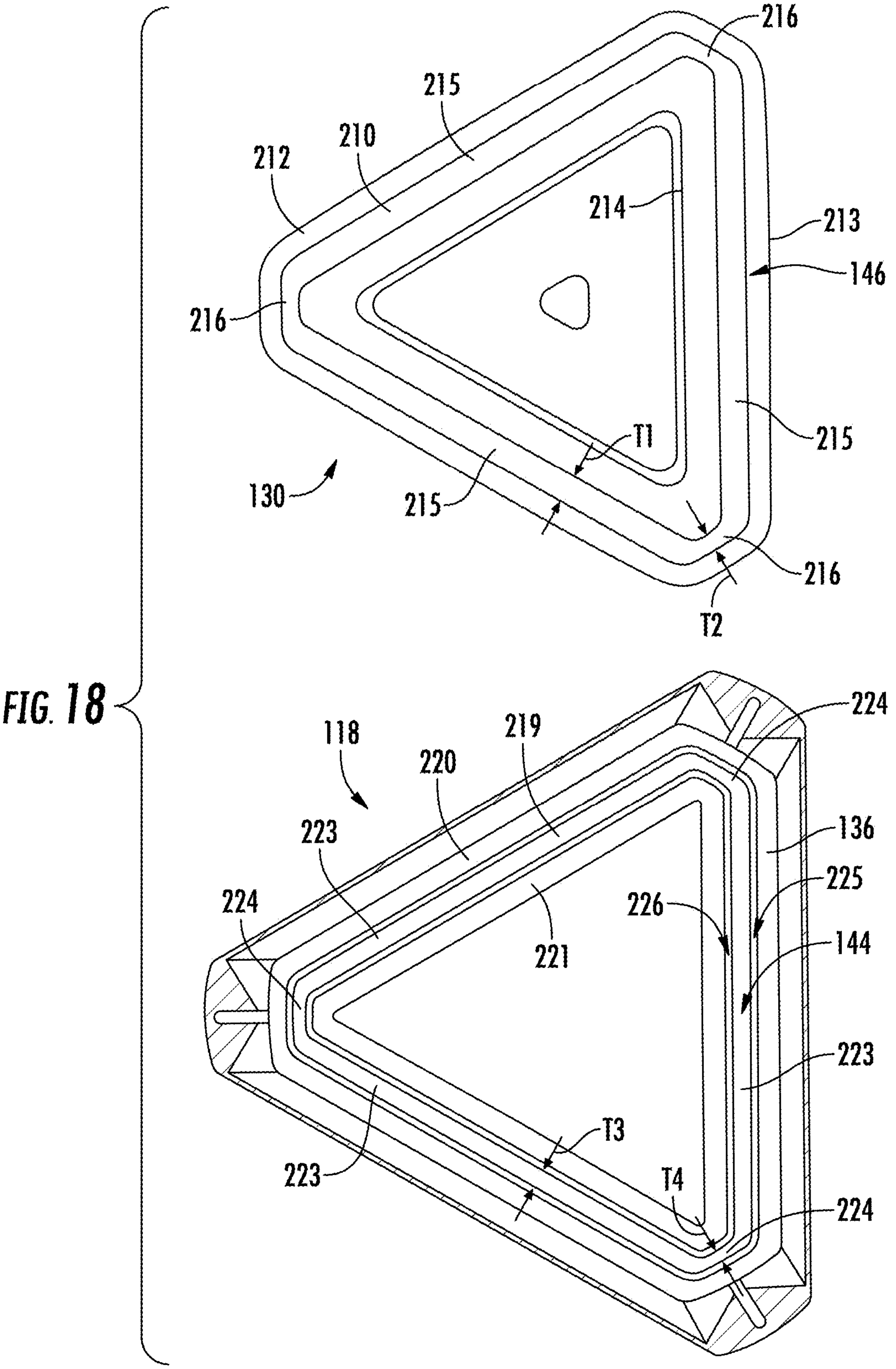
FIG. 18 illustrates a filter element and an end plate for securing the filter element with the end plate removed from the filter element illustrating the mating sealing features between the filter element and the end plate.
Figure 19:
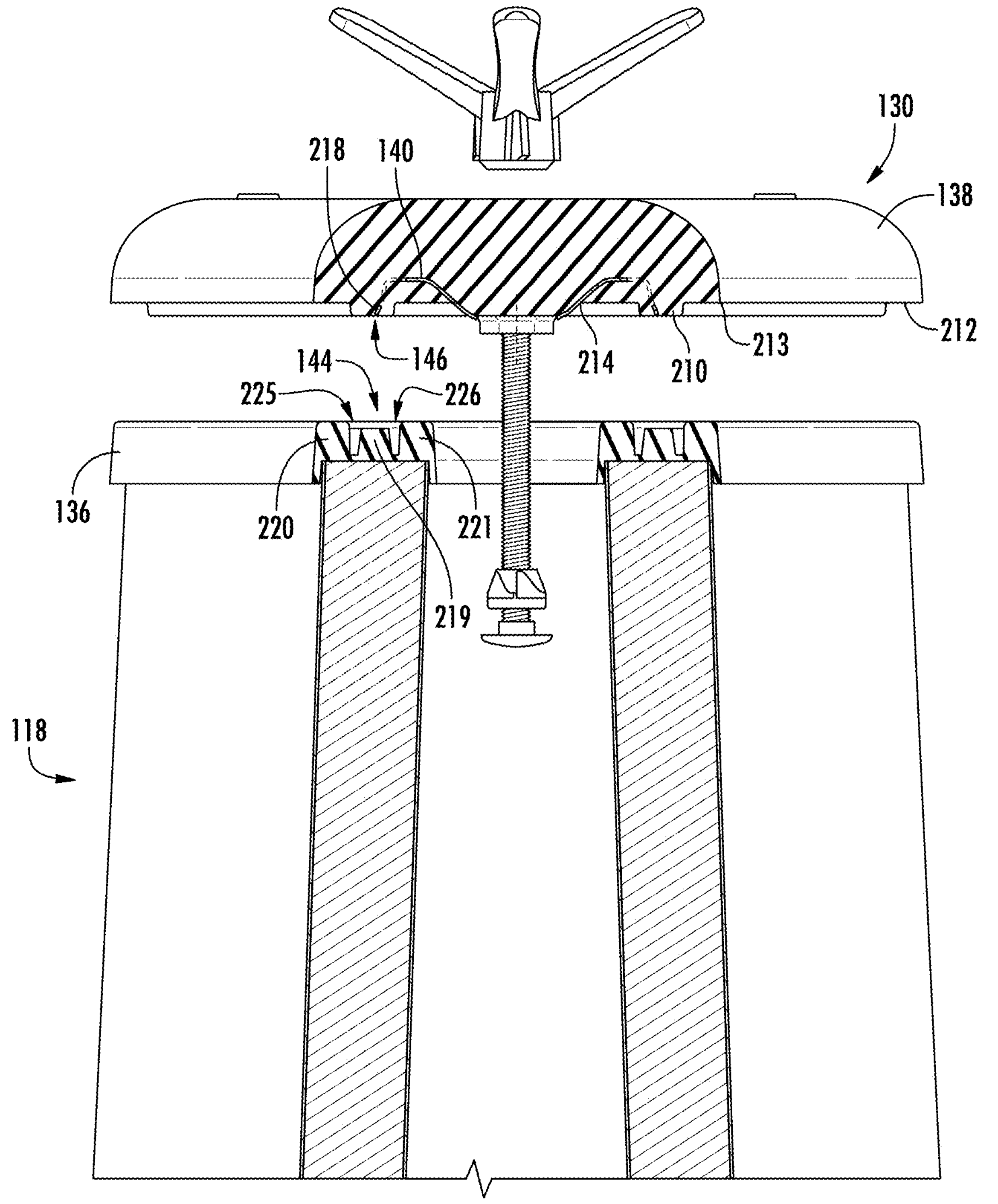
FIG. 19 is an exploded and cross-sectional illustration of an end plate removed from a filter element section.

With reference to FIGS. 18 and 19, the seal between the end plate 130 and the end plate seal 136 is described in more detail. The projection 146 of end plate 130 provides a first sealing rib 210 that projects axially from a body of the end plate that provides outward facing surface 212. The first sealing rib 210 is generally annular and forms a gasket. Notably, something that is annular need not be circular and could have other peripheral shapes. In this example, the first sealing rib 210 is generally triangular. The first sealing rib 210 is spaced radially inward from outer edge 213 and radially outward from inner edge 214. The inner edge 214 is where the surface 212 meets an inner portion if inner plate 140. As such, there is a portion of surface 212 radially outward of sealing rib 210 and radially inward of sealing rib 210.

Again, the sealing rib 210, in this embodiment, is annular and triangular in shape and thus has three sides illustrated as generally straight sections 215 with adjacent straight sections 215 interconnected by a corresponding corner portion 216.

The straight sections 215 have a thickness T1 that is generally greater than a thickness T2 of the corner portions 216.

As illustrated in FIG. 19, the inner plate 140 has outward extending flange portions 218 that extend generally along each side of the triangular periphery of the inner plate 140 and end plate 130. In this example, the flange portions 218 extend axially into the first sealing rib 210 and outward beyond outward facing surface 212. This allows the inner plate 140 and particularly the flange portions 218 to provide increased rigidity to the first sealing rib 210.

In this embodiment, the end plate seal 136 is molded to the filter media of first filter element section 118. The end plate seal 136 has cooperating structure that cooperates with the first sealing rib 210 and the outward facing surface 212 of the end plate 130.

With principle reference to FIG. 18, the end plate seal 136 has a second sealing rib 219 that is annular and triangular in shape when viewed in a plane generally orthogonal to a central axis of the filter element section. The triangular shape has straight sections 223 interconnected by corner portions 224. The annular configuration of second sealing rib 219 forms a gasket. The shape and size of the second sealing rib 219 coordinates with the shape and size of the first sealing rib 210 to provide a primary seal interface between the first and second sealing ribs 210, 219 when in an installed state.

With reference to FIGS. 18 and 19, a pair of shoulders 220, 221 straddle the second sealing rib 219. Shoulder 220 is radially outward of the second sealing rib 219 while shoulder 221 is radially inward of second sealing rib 219. The shoulders 220, 221 extend axially outward, e.g. away from the filter media of the first filter element section 118, farther than the second sealing rib 219. This forms groove 144 identified above in the outward facing end of the end plate seal 136.

In this example, the second sealing rib 219 is fully recessed relative to shoulders 220, 221. The groove 144, in this example, is annular.

Thus, in this example, the end plate seal 136 may be considered a female component while the end plate 130 may be considered male component. Again, this arrangement can be reversed in other examples.

The first and second shoulders 220, 221 are radially spaced from the second sealing rib 219 such that channels 225, 226 are formed therebetween. Channels 225, 226 are annular and have a triangular shape. Preferably, the adjacent walls of the shoulders 220, 221 and the second sealing rib 219 are tapered relative to one another such that the channels 225, 226 get wider when moving axially away from the filter media of the first filter element section 118.

In this example, with reference to FIG. 18, the straight sections 223 have a thickness T3 that is greater than thickness T4 of the corner regions 224. Further, in some, but not all, embodiments, the thickness T1 of rib 210 in the straight portions 215 is greater than corresponding thickness T3 while thickness T2 of corner portions 216 is greater than corresponding thickness T4. The smaller thickness T4 in the corner regions 224 relative to thickness T3 allows reduced localized axial clamping force to sufficiently compress the sealing rib 219 in the corner regions 224 and prevent dirty fluid bypass.

When assembled, such as illustrated in FIG. 2, a primary seal that is axially oriented is formed between the first and second sealing ribs 210, 219. The outer shoulders 220, 221 will axially abut the outer and inner portions of outward facing surface 212 and provide a gasket stop as well as provide secondary sealing functionality. The abutment of shoulders 220, 221 with outward facing surface 212 also provides increased stability at the interface between the end plate 130 and end plate seal 136.

In one example, the first sealing rib 210 extends axially from the outward facing surface 212 a greater distance than the second sealing rib 219 is recessed inward relative to the shoulders 220, 221. This allows the sealing ribs 210, 219 to axially engage prior to the shoulders 220, 221 engaging surface 212. Thus, during assembly, one or both of the sealing ribs 210, 212 will axially compress prior to engagement between the shoulders 220, 221 and surface 212. As such, when the user is tightening the end plate 130 against the first filter element section 118, significant tactile feedback will occur once the end plate 130 is fully seated against the first filter element section 118 and particularly against the end plate seal 136.

The triangular shape of the sealing rib 210 and groove 144 clock the end plate 130 to the end plate seal 136 to clock the end plate 130 to the filter element section 118.

With reference to FIGS. 1 and 23, the configuration of the mating seal arrangement 122 between the first and second filter element sections 118, 120, is the same configuration as between the end plate 130 and the end plate seal 136. The seal arrangement 122 includes a first seal member 262 that mates with a second seal member 263.

The first seal member 262 is provided by the first filter element section 118 and the second seal member 263 is provided by the second filter element section 120. The first seal member 262 has the same mating structures as those provided by end plate 130 discussed previously. More particularly, first seal member 262 includes sealing rib 264 and adjacent surfaces 265, 266.

However, unlike the end plate 130, which is generally impermeable because it closes off the end of the filter element 102 by closing off the end of filter element section 118, the first seal member 262 is annular and has opening 267 to permit fluid flow between the interior cavities formed by filter element section 118 and filter element section 120.

The second seal member 263 is substantially the same as end plate seal 136 except it may be dimension differently due to the frusto-conical configuration of filter element 102. The second seal member 263 includes seal rib 268, shoulders 269, 270 and recess 271 that forms an annular groove.

This seal arrangement 122 and the cooperating axially abuting ribs, shoulders and surfaces provides improved stability as noted above between the end plate 130 and end plate seal 136.

It is noted that while the first seal member 262 is illustrated as being the male component and the second seal member 263 is illustrated as being the female component, these configurations could be reversed.

The mating relationship between the first and second seal members 262, 263 clocks the filter element sections 118, 120 to one another.

The male components, e.g. end plate 130 and first seal member 262, are typically formed from a more rigid material than the female components, e.g. end plate gasket 136 and second seal member 263. This allows for more predictable deformation of the components of the seal arrangements. More particularly, the less rigid sealing ribs of the female components will compress first/prior to the more rigid sealing ribs of the male components. In some embodiments, the sealing ribs of the female components are configured to compress about one-half of their axial height when the cooperating components are properly axially engaged with one another after assembly. This better ensures that a predetermined amount of axial compression is applied to the sealing rib of the female component.

Tactile feedback can be provided to the operator because once the sealing ribs properly compress, the shoulders will then abut the cooperating surfaces of the other component providing an increase in resistance to further compression of the seal arrangement. The shoulders will thus operate as a gasket stop informing the user of when appropriate pressure has been reached and/or inhibit over compression of the seal ribs.

At the end of the second filter element section 120 opposite second seal member 263 is tube sheet seal 116. The tube sheet seal 116 includes a sealing rib 275 that is straddled by shoulders 276, 278. The sealing rib 275 is separated from shoulders 276, 278 by channels 279, 280. Again, similar to seal ribs 210, 219 above, when appropriate amount of axial compression is applied to tube sheet seal 116, seal rib 275 will be sufficiently compressed and the shoulders 276, 278 will abut tube sheet 104 and act as a gasket stop inhibiting further compression, e.g. over compression, of the seal rib 275.

Unlike the other sealing ribs 210, 219, sealing rib 275 projects axially outward beyond the end of should 276, 278. This is because the cooperating seal surface of the tube sheet 104 is generally flat (see e.g. FIG. 24).

However, it is contemplated that the sealing rib 275 could be recessed and the tube sheet 104 could provide a corresponding axial projection. This could also further facilitate clocking of the filter element 102 and particularly tube sheet seal 116 to the tube sheet 104.

Figure 24:
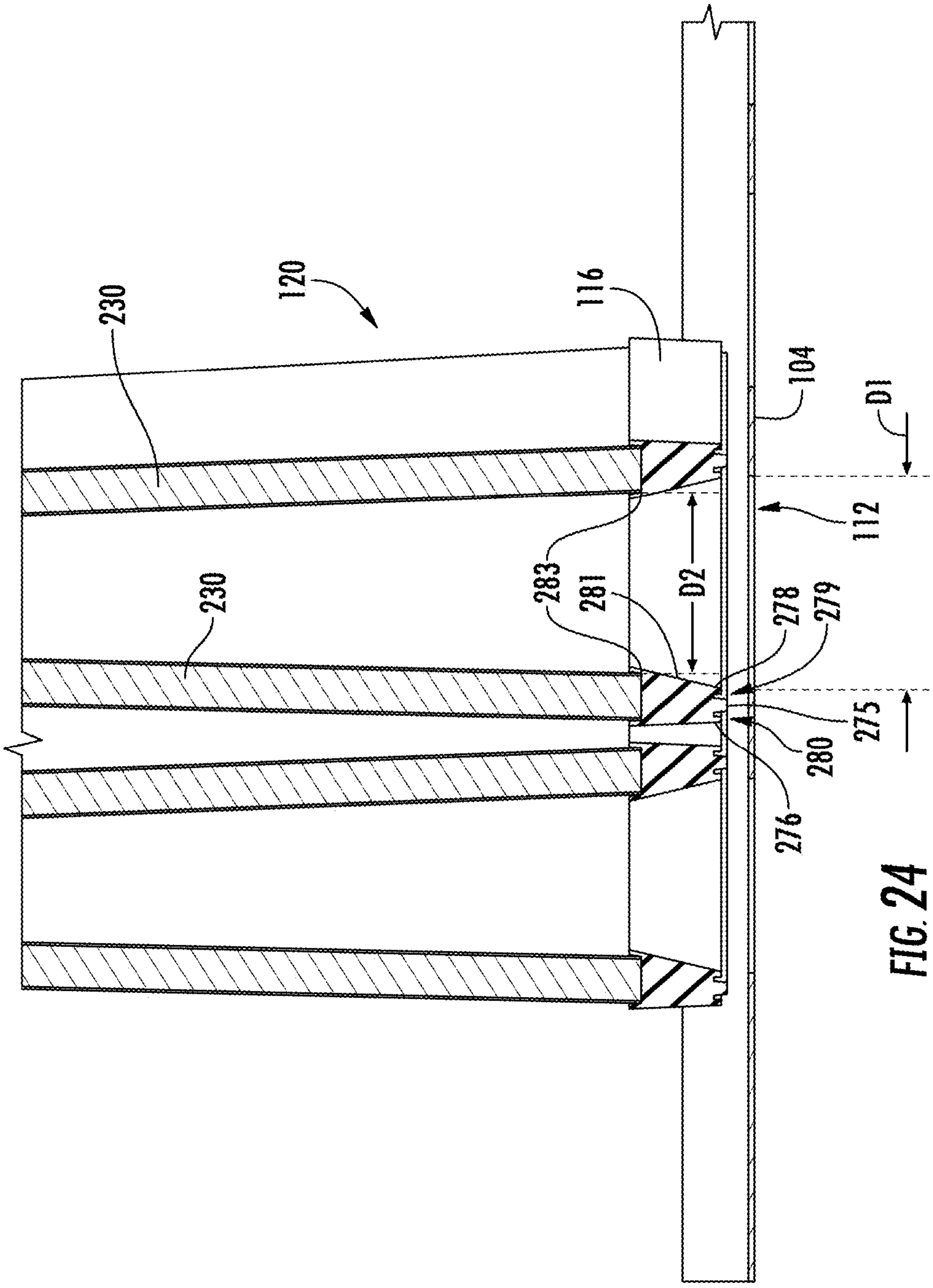
FIG. 24 is an exploded illustration illustrating filter elements spaced from a tube sheet and illustrating the tube sheet seal of the filter elements in cross-section.

As illustrated in FIGS. 2 and 24, the radially inward facing surface 281 of the tube sheet seal 116 is tapered radially inward when moving axially away from the tube sheet 104. Notably, the angle $\alpha 1$ of surface 281 from an axis 282 orthogonal to the tube sheet 104 is typically greater than angle $\alpha 2$ of the angular relationship of the sides of the filter element section 120 to axis 282. Angle $\alpha 2$ corresponds to the angle of the inner surface of the panel section 228 (e.g. the inner surface of the inner mesh support or the inner surface of the filter media) relative to axis 282. Axis 282 is typically parallel to a central axis of the filter element 102.

In the illustrated example, the tube sheet seal 116 and the flow apertures 112 are configured such that inner edge 283 of the end 284 of the filter media panel 230 closest the tube sheet 104 is spaced radially inward of the corresponding side of the aperture 112 illustrated by space R1 in FIG. 2. This applies for all three sides of the filter element 102. As illustrated in FIG. 24, the dimension D1 of the aperture 112 is thus greater than dimension D2 formed between opposed inner edges 283 of the end 284 of the filter media panels 230.

The inclusion of tapered surface 281 provides a fairing at the outlet from the interior cavity of the filter element 102. This arrangement provides some static pressure recovery. The different angles and particularly more tapered magnitude of angle $\alpha1$ improves the recovery of static pressure. In a preferred example angle $\alpha1$ will be at least 5 degrees but less than 30 degrees. This tapered arrangement allows the flow exiting the filter element 102 to diffuse before reaching the tube sheet aperture 112. This also reduces the extent of any wake in the air flow exiting the filter element and tube sheet 104. This provides an associated reduction in total pressure loss across the filter element 102.

This results in a filter element with a lower pressure loss for a given airflow, or higher air flow for a given pressure drop. This can provide benefits including, but not limited to, use of fewer filter elements, higher efficiency media which can provide longer life to downstream components, higher output by downstream components (such as turbines) or longer filter life by allowing for a larger degree of pressure drop due to increased amount of loading of impurities filter from the air flowing through the filter media.

By reducing the pressure losses associated with the system, air flow through the filter system can be increased, thus allowing for a reduced number of filter elements 102 required for a given air flow rate.

The inner surface 287 of the tube sheet seal 116 within the corner region has an angle $\alpha3$ (see FIG. 2) that is more parallel to axis 282 than angle $\alpha1$. This angle $\alpha3$ is configured to promote a snug fit engagement of the corner regions of the inner surface 287 with the legs 285 of the yoke 106. This promotes proper alignment (i.e. clocking) of the filter element section 120 relative to aperture 112. In some embodiments, the corner regions form sweeps or pockets that receive and wrap around the legs of the yoke 106 when mounted.

Figure 25:
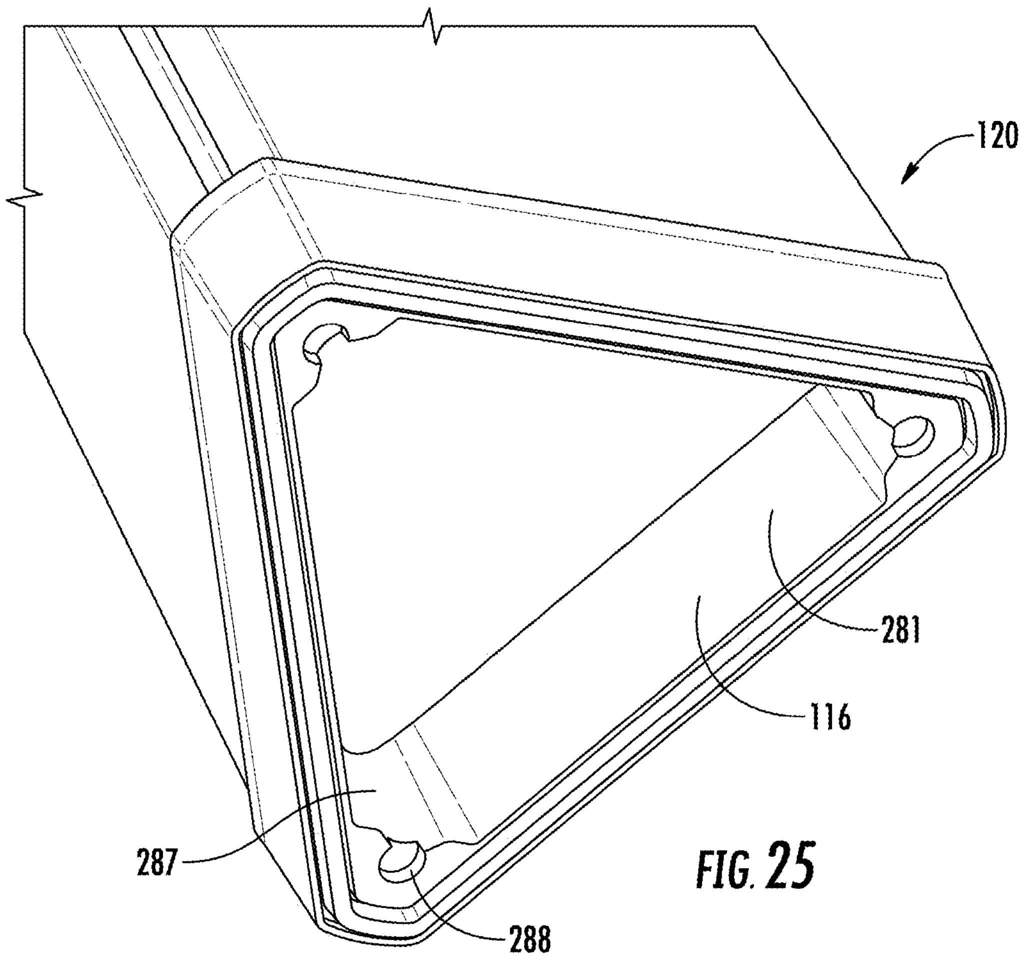
FIG. 25 is an end perspective view of a filter element section and a tube sheet seal thereof.

With reference to FIGS. 2 and 25, the tube sheet seal 116 includes pockets 288 for receiving the yoke bolts 289 in each corner. In this example, the pockets 288 receive the heads of yoke bolts 289. By capturing the heads of the yoke bolts 289 within the pockets 288, the tube sheet seal 116 inhibits back driving of the yoke bolts 289 in use.

In FIGS. 2 and 24 the tapered region (e.g. surface 281) is provided by the tube sheet seal 116 that is integrally formed with the rest of the filter element section 120, e.g. molded directly to or adhesively secured directly the panel sections 228.

Figure 26:
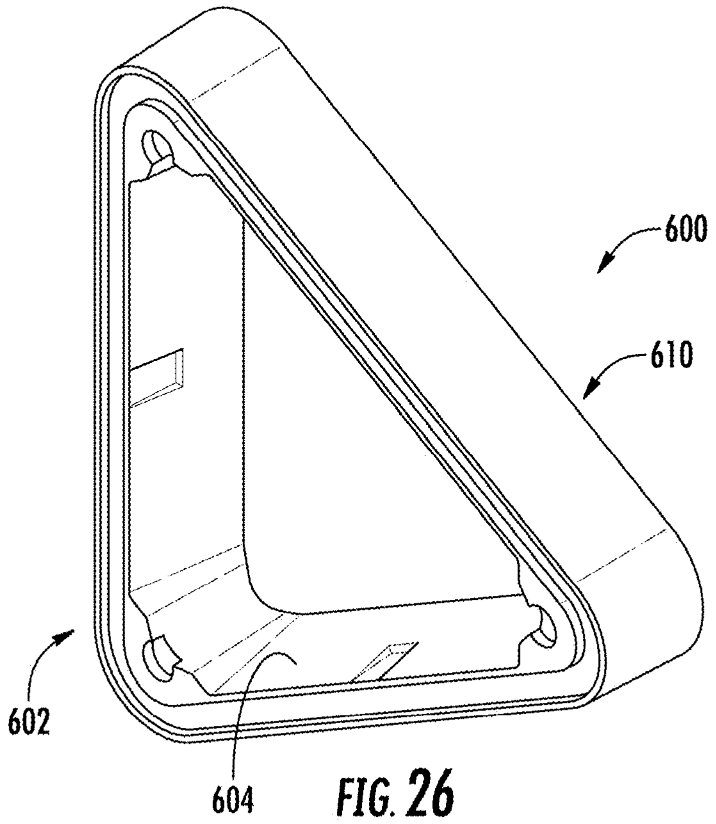
FIGS. 26 and 27 are perspective illustrations of an adaptor that may be used with filter elements and a tube sheet that provides an outlet fairing for improving flow characteristics of an associated filter element.
Figure 27:
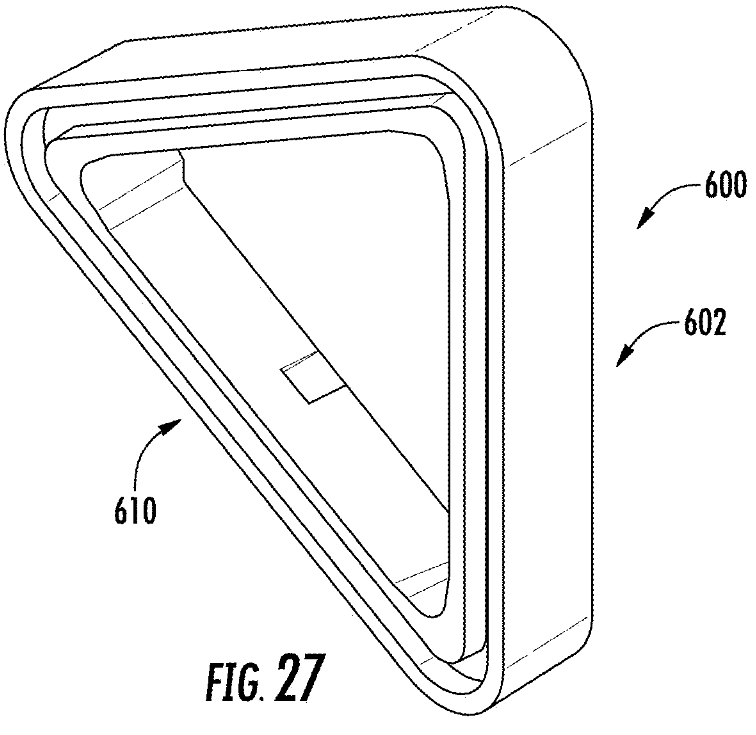

With reference to FIGS. 26 and 27, in alternative embodiments, a tapered outlet adapter 600 could be provided.

The outlet adapter 600 has a tube sheet end 602 that is substantially identical to the outlet end of the tube sheet seal 116 described previously. As such, the tube sheet end 602 may include a sealing rib one or more shoulders that act as a gasket stop as well as pockets for receiving yoke bolts 289. Further yet, the adapter 600 may have tapered inner surface 604. However, in this example, the adaptor is a separate component from the rest of filter element 102. This adaptor may be reusable with other filter element sections.

A filter element end 610 of the adaptor 600 would be configured similar to second gasket 263 described previously and would be configured to mate with a seal of a corresponding filter element/filter element section that is similar to first seal member 262 provided by the filter element/filter element section.

In other examples, the streamlined fairing, e.g. tapered surface 604, could be provided by a component that forms part of the tube sheet 104. For example, the adaptor 600 could be incorporated into or permanently secured to the tube sheet 104.

The adaptor 600 may be molded, pressed metal, 3-d printed, a polymer molding or co-molding with a metal insert.

When the adapter 600 is a separate component, the corners of the adaptor 600 may be configured similar to corner regions of the tube sheet seal 116 and provide a snug fit arrangement with legs 285 of the filter mounting yoke 106.

For pleated filter media, media permeability, overall media area, pleat size and spacing all influence the pressure loss across the media pack and hence the relative distribution of pressure losses between the media pack and filter framework. For the same filter element topology, but different media packs, different adapters/fairings may be supplied or attached to the filter element, with varying lengths, inlet or outlet areas, depending on whether lower cost, lower pressure loss, or increased media area are desired. For example, a cartridge filter with a deeper media pack and an adapter would have the same outlet aperture, and therefore, similar outlet pressure loss, as a filter with a shallower media pack, and could utilize the same mounting arrangement inside the filter system.

While the adaptor is shown in use with a triangularly shaped filter element, the adaptor concept is equally applicable to filters of different shapes, such as, without limitation, round or square cross-section filter elements.

In addition to the outlet end of the filter elements 102 having pressure reduction features, e.g. the tapered inner surfaces of either the seal member 116 that cooperates with the tube sheet 104 or the adapter 600, the end plate 130 includes pressure reduction features. Again, reduced pressure loss for the air flowing the system can provide one or more of the benefits mentioned above as it relates to air flow through the system.

As filter elements 102 are positioned closer together to reduce the size of the filter house, increase the number of filter elements in a filter house, or a combination of both, the filter framework and components of the system can disrupt the air flow approaching the filtration media creating drag and leading to increased pressure loss.

As such, an end face of the end plate 130 includes fairing features on the radial outer most periphery to help reduce disturbance to the incident airflow at the upstream end of the filter element 102, e.g. the end spaced away from tube sheet 104. Flow separation from this peripheral edge is reduced or eliminated and flow entering the passage between two adjacent filters will have a lower, more uniform velocity. This reduces drag as well as allows the air flow to more effectively use and pass through the filter media proximate the end plate 130 rather than flowing around the end plate 130 and then first coming into contact with the filter media at a location spaced away from the end plate 130 and closer to the tube sheet 104. This increases the amount of useable surface area of the filter element 102 thereby reducing pressure drop across the filter element 102 as well as the service life of the filter element 102.

Figure 3:
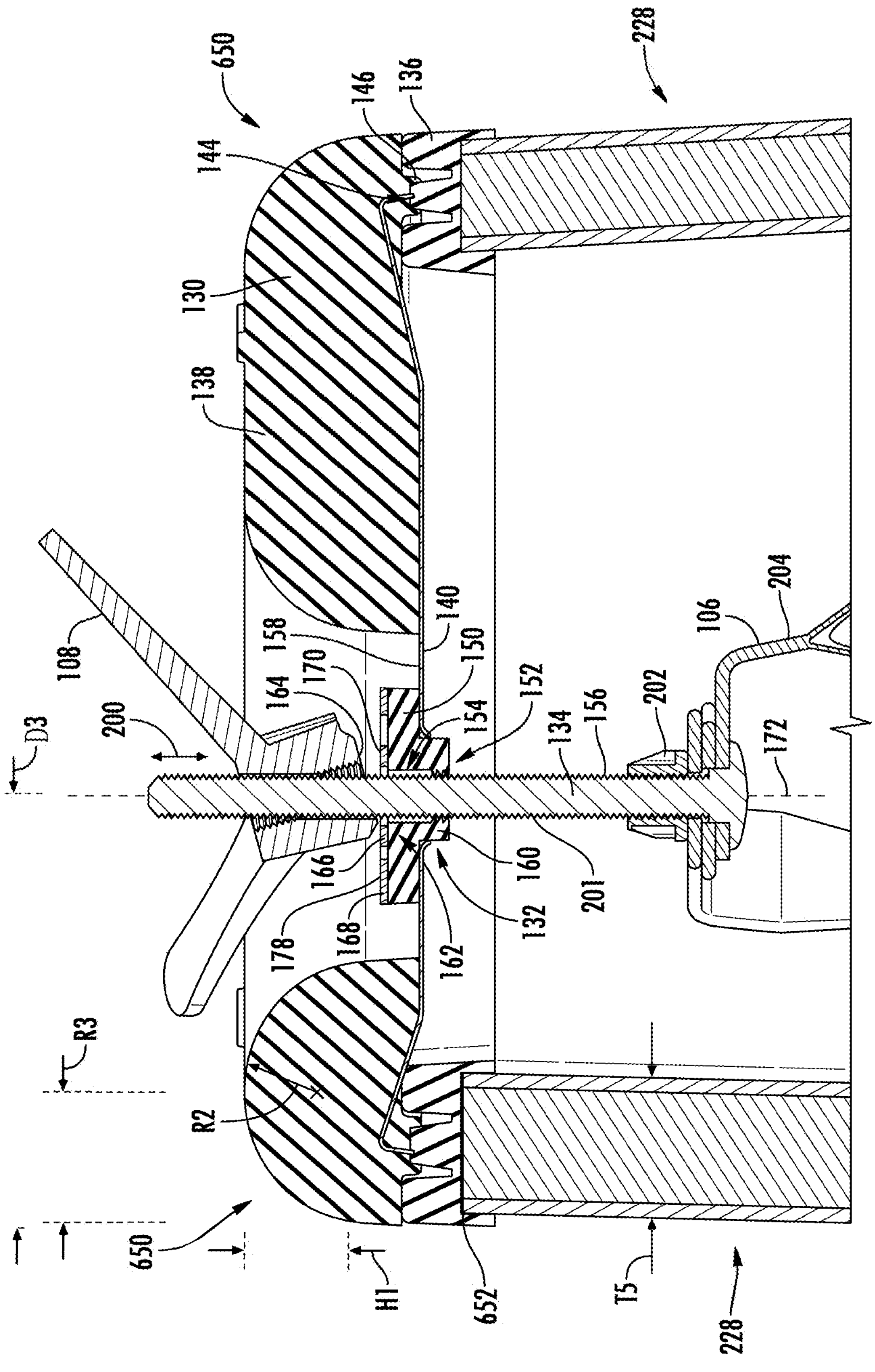
FIG. 3 is a partial cross-sectional illustration of a filter element of FIG. 1 with an attachment member in a quick mount or removal orientation.

With reference to FIGS. 2 and 3, in one example, the fairing of the end plate 130 is a curved profile incorporated into the outer periphery of the end plate 130 such as illustrated proximate arrows 650. In the illustrated example, the curved profile 650 is provided by a half round but could take other shapes such as quarter round curved profile. In this example, the radially outer portion of the half round may be the only functional portion of the half round profile. The curved profile need not have a constant radius of curvature. Further, it could be different than 180 degree (half round) or 90 degree (quarter round) profiles as mentioned above.

In a preferred example, the radius of curvature R2 of the curved profile 650 is at least 25% of the shortest distance between the edge of the end plate and its centroid, more preferably at least 30% of this distance. The larger the radius of curvature R2 the reduced amount of disturbance that occurs to the airflow as it flows around the curved profile 650 of the end plate 130 by providing a smaller rate of change in the flow direction.

The centroid may or may not go through the center of the mounting aperture through the end plate.

The curved profile 650 preferably extends radially outward to the upper most outer edge 652 of the panel section 228 and radially inward as illustrated by radial dimension R3 at least 25% of the shortest distance between the edge of the end plate 130 and its centroid, more preferably at least 30% of this distance.

The radius of curvature R2 of the curved profile 650 is also preferably at least 12% and ideally 25% of the distance between the outermost edge of end plate 130 and the parallel edge of end plate on the next adjacent filter.

Preferably, the curved profile 650 is also at least a quarter round such that the curved surface extends at least 90 degrees if it has a constant radius of curvature.

In some examples, the axial height H1 of the curved profile 650 is at least 25% of thickness T5, more preferably at least 50% of thickness T5.

Figure 4:
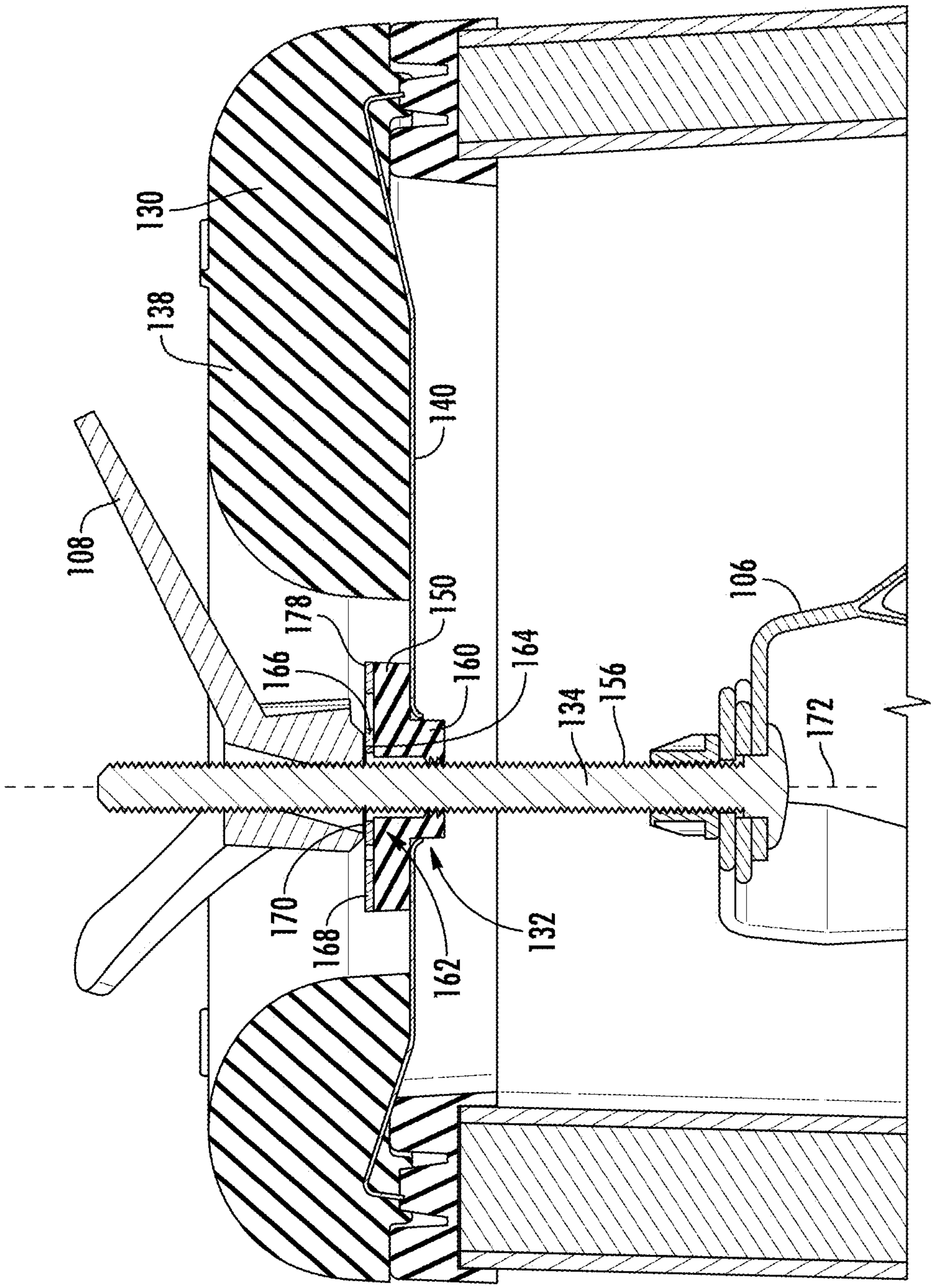
FIG. 4 is a partial cross-sectional illustration illustrating the attachment member of FIG. 3 pivoted to a tightening orientation prior to tightening.

The curved profile 650 can be provided by a removable/reusable end plate 130 such as the end plate 130 illustrated in FIG. 2-4, or could be formed by an end plate that is permanently attached to the filter element 102 such as by way of being adhesively secured or molded to the rest of the filter element 102. In the illustrated example, the curved profile 650 and associate fairings provided thereby are formed by the outer shell 138 of the end plate 130.

The curved profile could be provided by a fabricated component, a pressed metal part, a 3-d printed part, a polymer molded part, a component co-molded with a metal insert.

The inlet fairings may have cut-outs, or recesses to facilitate mounting and securing of the filter in a holding frame or to yoke 106. Where fairings are separate components that are reusable, they may include seals or gaskets on mating surfaces.

With reference to FIGS. 2-5, a compression member 150, illustrated in the form of a washer, is interposed between the handle 108 and the end plate 130. In this example, the compression member 150 is also interposed between the end plate 130 (particularly the inner plate 140) and the threaded shank 134 of the mounting yoke 106.

The compression member 150, of this example, provides a first function of sealing the end plate 130 to the threaded shank 134 of the mounting yoke 106 to prevent dirty fluid bypass through the end plate aperture 132. More particularly, the compression member 150 includes a seal region 152, which may be referred to or provided as a separate seal. With additional reference to FIGS. 6 and 7, the seal region 152 is a helical wiper seal on an inner diameter of a bore 154 also referred to as a compression member aperture through the compression member 150. The helical wiper seal is sized and configured to mate with the external threads 156 of the threaded shank 134. Thus, the seal region 152 is generally a threaded structure with several threads that mate with and are similar to the threads 156 of threaded shank 134.

In one example, the helical wiper seal (e.g. threads of the compression member 150) may be sized smaller than normal mating threads that would otherwise mate with threads 156 to promote improved sealing between the seal region 152 and threaded shank 134. In one example, the helical wiper seal is sized to engage with the minor diameter of the threads of the threaded shank 134 but have an increased major diameter, thereby increasing compliance and allowing them to bend and not shear when the threaded shank 134 is passed through the inner diameter of bore 154.

In other examples, the inner diameter of the seal region 152 may be sized such that it simply deforms into threads 156 to effectuate the seal with shank 134.

In addition to sealing to threaded shank 134, the compression member 150 seals with the end plate 130. In this embodiment, the seal provided therebetween may be both an axial seal of the compression member 150 being pressed against an outer surface 158 of inner plate 140 as well as a radial seal between the portion of inner plate 140 forming end plate aperture 132 and an alignment projection 160 (see e.g. FIGS. 3 and 7) of the compression member 150 that extends through end plate aperture 132.

In addition to the sealing function, axial load to secure the filter elements 102 to the tube sheet 104 with good sealing engagement between tube sheet seal 116 and tube sheet 104 is transmitted from the handle 108 to the end plate 130 through the compression member 150.

In one example, the compression member 150 is configured to provide torque identification and/or limiting that either or both of identifies when sufficient load is applied to the filter element 102 from handle 108 or/and prevents over loading the filter element 102 by over torqueing handle 108.

More particularly, the compression member 150 includes a compression region 162. The handle 108 and particularly an axial pressure region 164 thereof presses on the compression region 162 when the handle is rotated to tighten the handle 108 against the filter element 102.

In one example, a desired amount of axial load is used to press the tube sheet seal 116 against the corresponding sealing surface of the tube sheet 104 (see e.g. FIG. 2). Over tightening of the handle 108 can over compress tube sheet seal 116 leading to potential failure of the tube sheet seal 116 or other components of the filter element 102. Under tightening can provide improper seating of the filter element and allow leak paths.

However, as the tube sheet seal 116 may not be visible when mounting the filter element due to the size of the filter elements 102 and the arrangement of the filter elements 102 on tube sheet 104, the compression member 150 can provide a cue as to when the desired load is being applied by handle 108. Other cues are outlined below.

The compression region 162 is configured to compress once the desired load is applied by the handle 108 to the compression member 150. Thus, the user may be able to visually see the compression of the compression member 150, such as in the compression region 162, and determine that sufficient axial load is being applied.

In one example, the tube sheet seal 116 is has a first minimum axial load required to provide a desired seal with the tube sheet 104. The compression region 162 begins to compress under a second minimum axial load that is greater than the first minimum axial load. As such, the compression region 162 will not begin to compress, at least in a significant manner (e.g. less than 20%), until sufficient loading has been applied to the tube sheet seal 116. As such, if the user has not seen evidence of compression of the compression member 150, such as at the compression region 162, the user would know that insufficient force is being applied to the filter element and particularly to tube sheet seal 116.

In one example, the tube sheet seal 116 is configured (e.g. size, shape, material properties, etc.) such that it will deform at loading less than the second minimum axial load such that it will deform prior to the compression region 162 deforming due to loading provided by handle 108.

In some examples, the tube sheet seal 116 is formed from a material that is softer than the material used to form the compression member 150 and particularly the compression region 162, thereof. For example, the durometer of the compression region 162 may be greater than the durometer of the tube sheet seal 116.

In the illustrated example, first and second washer members 166, 168 are attached to the compression member 150. The first washer member 166 is positioned radially inward of the second washer member 168. In this example, the first and second washer members 166, 168 are discrete members formed from separate bodies of material such that the two components are not formed into a single continuous piece of material. The washer members 166, 168 could be formed from metal, such as steel or aluminum or from a plastic that is preferably more rigid than the material of the compression member 150.

The first washer member 166 is aligned with the compression region 162. As such, the first washer member 166 and compression region 162 have a similar radial spacing from the central axis 172 of the bore 154. This central axis 172 is also coincident with the central axis of threaded shank 134.

The handle 108, and particularly, axial pressure region 164 axially presses against and angularly slides on the outer face 170 of the first washer member 166 when the handle 108 is being tightened to secure the filter element 102 against the tube sheet 104 so as to apply loading to the compression region 162 and the compression member 150.

Figure 5:
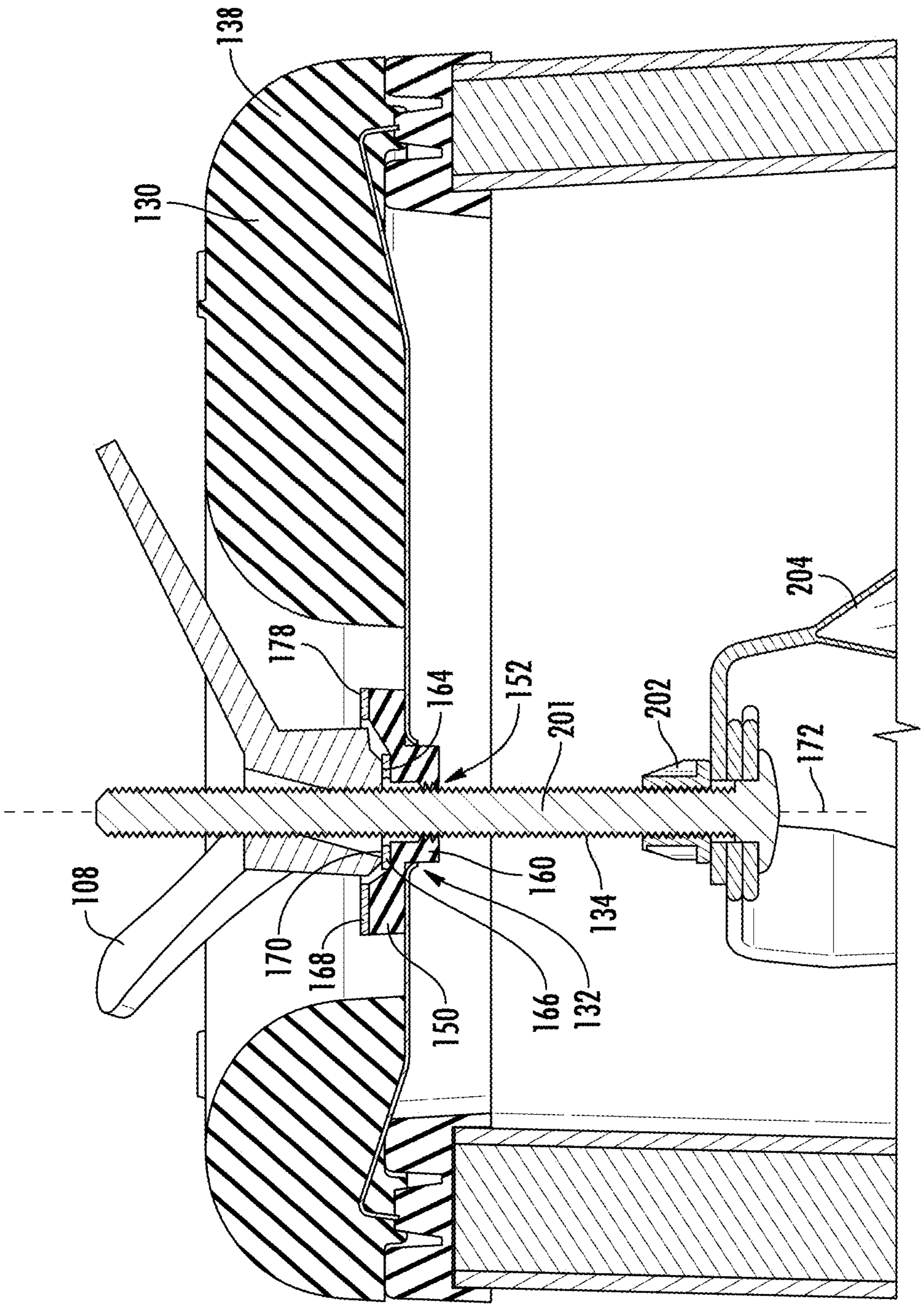
FIG. 5 is a partial cross-sectional illustration illustrating the attachment member of FIG. 4 tightened and compressing the compression member.

The transition from FIG. 4 to FIG. 5 illustrates the compression of compression region 162 as the handle 108 is rotated to tighten the filter element 102. As illustrated in FIG. 4, the compression member 150 and the compression region 162 are in an undeformed state with the handle axially pressing against the outer face 170 of the first washer member 166.

As the user rotates the handle 108 to tighten the assembly, the compression member 150 and compression region 162 thereof compress and deform. This is illustrated in FIG. 5. Notably, during this process, the first washer member 166 becomes axially displaced relative to the second washer member 168. This provides an initial visual identification that the desired amount of axial load is being approached. Further, in some embodiments, the compression region 162 is configured such that at the onset of axial displacement of the compression region, torque feedback to the installer should also increase.

The second washer member 168 functions to prevent over tightening the handle 108 to prevent overloading the filter element 102 and particularly any of the seals therein and more particularly the tube sheet seal 116.

The second washer member 168 defines a plurality of first angular catches 174. These angular catches 174 are radially offset from the center of the end plate aperture 132 (e.g. offset from axis 172). These angular catches 174 define abutments that will engage and inhibit rotational motion of handle 108 once sufficient loading has been applied.

The handle 108 includes a plurality of second angular catches 176 that will angularly abut the first angular catches 174 to prevent continued angular rotation of handle 108. The second angular catches 176 are axially offset from the axial pressure region 164 of the handle 108. Thus, when the handle 108 initially abuts the top surface 170 of the first washer member 166 as illustrated in FIG. 4, the second angular catches 176 are axially offset from the first angular catches 174 such that the catches 174, 176 will not abut or inhibit angular rotation of the handle 108.

Other axial offset orientations are contemplated. For example, washer members 166, 168 could be axially offset rather than axial pressure region 164 and second angular catches 176. Alternatively both the washer members 166, 168 and the axial pressure region 164 and second angular catches 176 could be axially offset.

As the load increases due to increased tightening of handle 108, the compression region 162 compresses independent of or at a greater rate than the portion of compression member 150 proximate the second washer member 168. As such, the axial spacing/offset between the first angular catches 174 and the second angular catches 176 reduces as the load increases. Once a desired amount of load is present, the compression region 162 will be sufficiently compressed that the first and second angular catches 174, 176 can abut when angularly aligned. In this condition, continued rotation will be inhibited.

Figure 11:
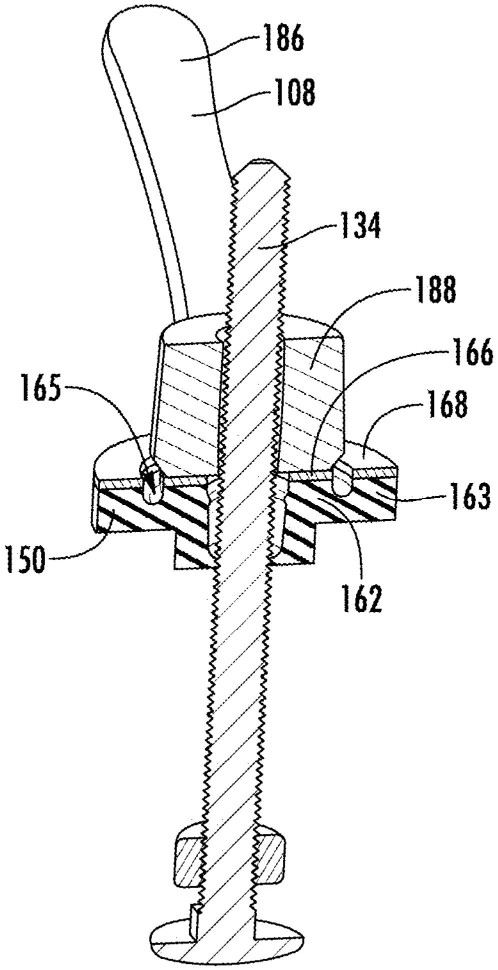
FIG. 11 is a cross-sectional illustration of a handle and compression member in an uncompressed state.
Figure 12:
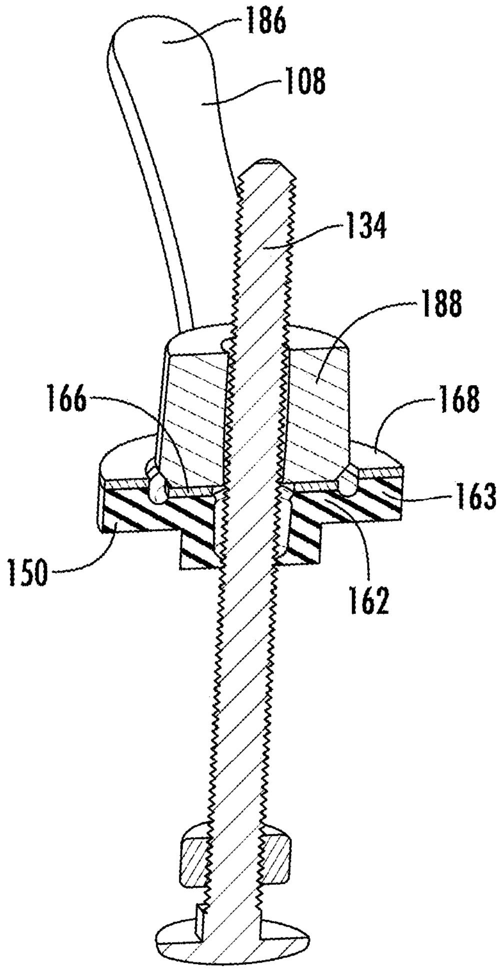
FIG. 12 is the handle and compression member of FIG. 11 in a compressed state.

With reference to simplified FIGS. 11 and 12, the compression member 150 can have geometry changes, such as in the form of a groove 165, between the compression region 162 and region 163 (a radially outer region in this example) that supports second washer member 168 to help separate the compression of compression region 162 from acting on the second washer member 168.

The groove 165 isolates compression region 162 from region 163 to prevent or reduce shear forces between the compression region 162 and region 163, which could cause undesirable compression of region 163 and axial displacement of second washer member 168. Alternatively, this could cause the second outer washer member 168 to disconnect (e.g. peal) from the compression member 150. FIG. 11, shows compression region 162 in an uncompressed state and FIG. 12 shows the compression region 162 in a compressed state.

Figure 8:
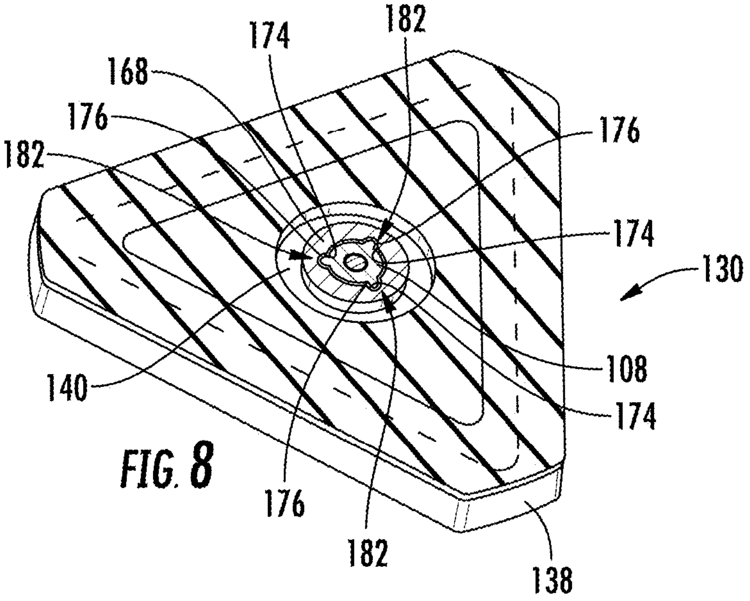
FIG. 8 is a cross-sectional illustration of the handle engaged with a torque limiting component of the filter element.

Notably, the desired amount of load may occur when the second angular catches 176 are angularly offset from the first angular catches, such as located angularly between adjacent first angular catches 174. In this situation, the user will rotate the handle 108 while the bottom of the angular catches 174 slides on the top surface 178 of the second washer member 168 until the first and second angular catches 174, 176 abut. In this instance, when properly aligned, the projections 180 that define the second angular catches 174, 176 will drop into the lobes 182 or recesses formed in the second washer member 168 that form the first angular catches 174. This action allows the opposed catches 174, 176 to abut and inhibit further rotation allowing for continued tightening of handle 108. FIG. 8 is a cross-sectional illustration through the second washer member 168 and the handle 108 when sufficient loading has occurred to allow the first and second angular catches 174, 176 to abut and to allow projections 180 to drop into lobes 182.

During this process as the bottom of the catches 174 slide on the top surface 178 of the second washer member 168, there will be increasing torque feedback to the installer. During the remaining rotation of handle 108 relative to compression member 150, the compression region will continue to compress. Once the angular catches 174 drop into lobes 180, some of the compression will release and result in both pronounced feedback to the installer and increased axial engagement between the catches 174, 176.

When the handle 108 drops into the lobes 182, this may also provide tactile feedback to the operator that the proper loading of the handle 108 against the filter element has been reached.

It is noted that in this embodiment, the compression member 150 and particularly portion 160 has a triangular cross-section that corresponds to a triangular cross-section of the end plate 130 so that the compression member 150 and attached second washer member 168 are angularly clocked to the end plate 130.

Figure 9:
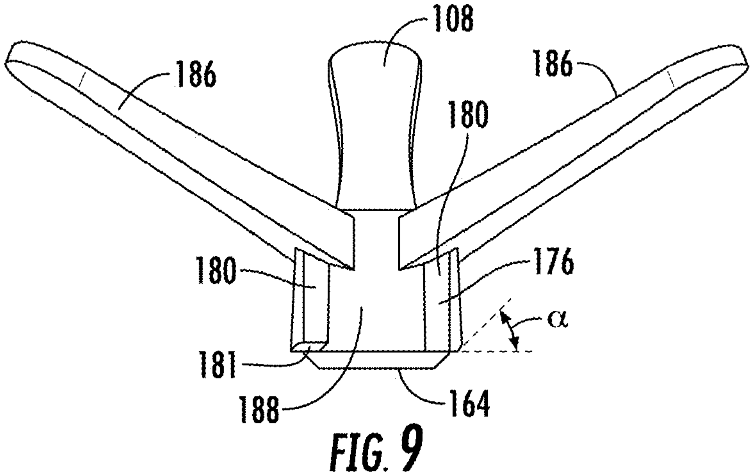
FIG. 9 is a side view illustration of a handle of the filter system of FIG. 1.
Figure 10:
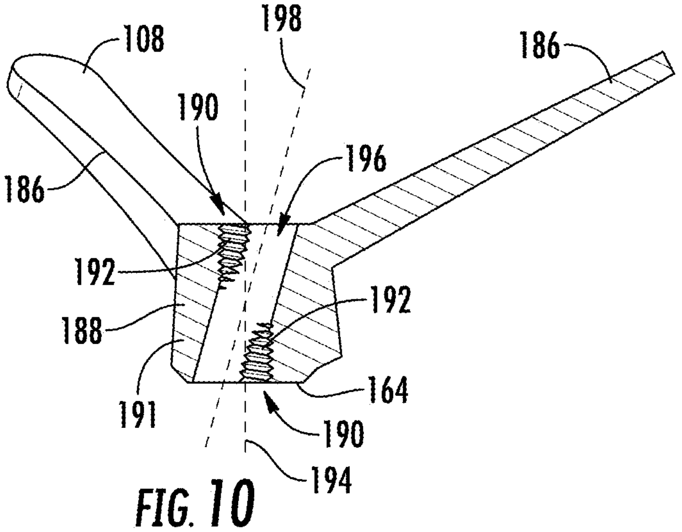
FIG. 10 is a cross-sectional illustration of the handle of FIG. 9.

With reference to FIG. 9, the faces of projections 180 opposite the second angular catches 176 may provide a tapered surface 181 to assist in axially lifting the projections 180 out of lobes 182 when loosening handle 108. The angle $\alpha$ of the tapered 181 shall be such that premature loosening of the handle 108 is prevented, such as by way of vibrations, but sufficient enough to allow for a user to avoid needing a tool to loosen handle 108.

Here, the load applied by handle 108 will be slightly greater than the minimum desired load. In this example, by using three first angular catches 174 and three second angular catches 176, each of which are evenly angularly spaced apart (e.g. spaced apart 120 degrees), the amount of over-tightening after the desired load is reached will be held at an acceptable minimum.

The action of the projections 180 dropping into the lobes 182 of the second washer provides a further cue that the handle 108 has applied an appropriate level of loading.

Notably, FIG. 13 illustrates a handle 308 with only two levers 386.

Figure 15:
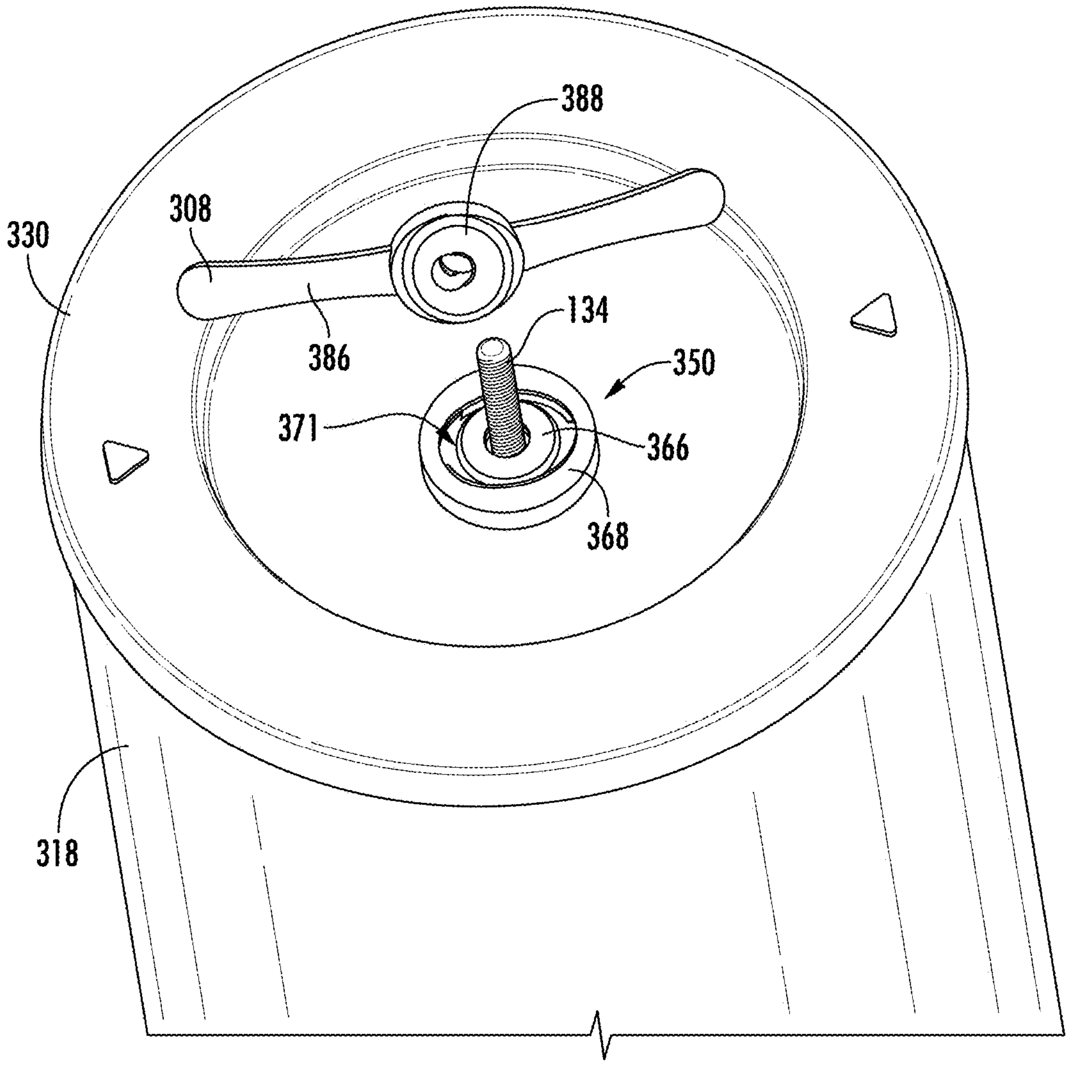
FIG. 15 is an enlarged partial illustration of the filter element and handle of FIG. 13 with the handle removed.

With additional reference to FIGS. 14 and 15, the coupler 388 of this design has an oval cross-sectional shape. The compression member 350 and particularly the second washer member 368 has an opening 371 that has a corresponding oval shape. When the desired load is applied to sufficiently compress the compression region 362 and the corresponding oval shapes are aligned, the coupler 388 is permitted to drop into the oval opening defined by the second washer member 368 and provide the visual and tactile cue that the handle 308 is properly tightened.

In other examples, the filter element 102 may include one or more identifiers thereon that determines when the desired load is applied. For example, as illustrated in FIG. 1, the end plate 130 and particularly the outer shell thereof 138 includes identifiers in the form of triangles provided on an outer surface of outer shell 138. As illustrated in FIG. 1, the levers of the handle 108 are aligned with the triangles that provide a quick and easy visual cue that the handle 108 has been properly tightened.

Further yet, the non-circular shape of the filter element or components thereof, e.g. the end plate 130, can provide the visual cue. It is clear in FIG. 2, for the mounted filter element 102, that each lever of the handle extends towards a corner of the triangular shape of the filter element 102. This again, provides a visual cue for quick and easy inspection to determine if the desired load has been reached.

In addition to and/or in opposite to determining when a desired load has been reached, these visual cues may at a minimum may illustrate if the handle 108 has been moved from its desired orientation. For example, if it is known that the handle 108 was originally tightened to the desired load, if the handle 108 is not in the proper orientation relative to the visual identifier/cue, an operator would quickly know to check the securement of the particular filter element 102/handle 108.

In this example, the rotation limiting feature provided by the second washer member 168 could be provided by the first end plate 130 or other components of the filter element 102.

In this example, the second washer member 168 is angularly fixed to the compression member 150, the compression member 150 is angularly fixed to the first end plate 130, the first end plate 130 is angularly fixed to the filter element sections 118, 120 which are angularly fixed to the mounting yoke 106. Thus, over rotation of the handle 108 cannot occur by rotation of the filter element 102 allowing for over loading of the sealing elements in the system.

As noted above, the compression member 150 and the first angular catches 174, in this example, are removable and reusable. In other embodiments, the compression member 150 and/or the first angular catches 174 are permanently attached to the end plate 130 and/or the rest of the filter element 102. The end plate 130 may be a permanent component of the filter element 102 or a reusable component.

Further, the angular catches could be provided by other shaped structures and could be reversed such that the projections could be provided by the filter element and the lobes or recesses could be provided by the handle. Other shapes such as apertures and pins could be used.

In addition to the features above, the handle 108 is configured for quick attachment and release from the threaded shank 134 of the mounting yoke 106. The handle 108 includes a plurality of levers 186 attached to a coupler 188. In this example, the handle 108 is a single unitary body with the levers 186 and coupler 188 formed from a continuous piece of material.

In some arrangements the lever(s) 186 and coupler 188 are separate components that rotationally engage one another. In such an arrangement, once the levers 186 has been used to tighten the coupler 188 to secure the filter element sections to the yoke 106, the levers 186 can be used to secure additional couplers 188 to other yokes 106 for securing other filter element sections. Thus, a single lever component is required for use with multiple couplers 188 of the overall system.

Figure 16:
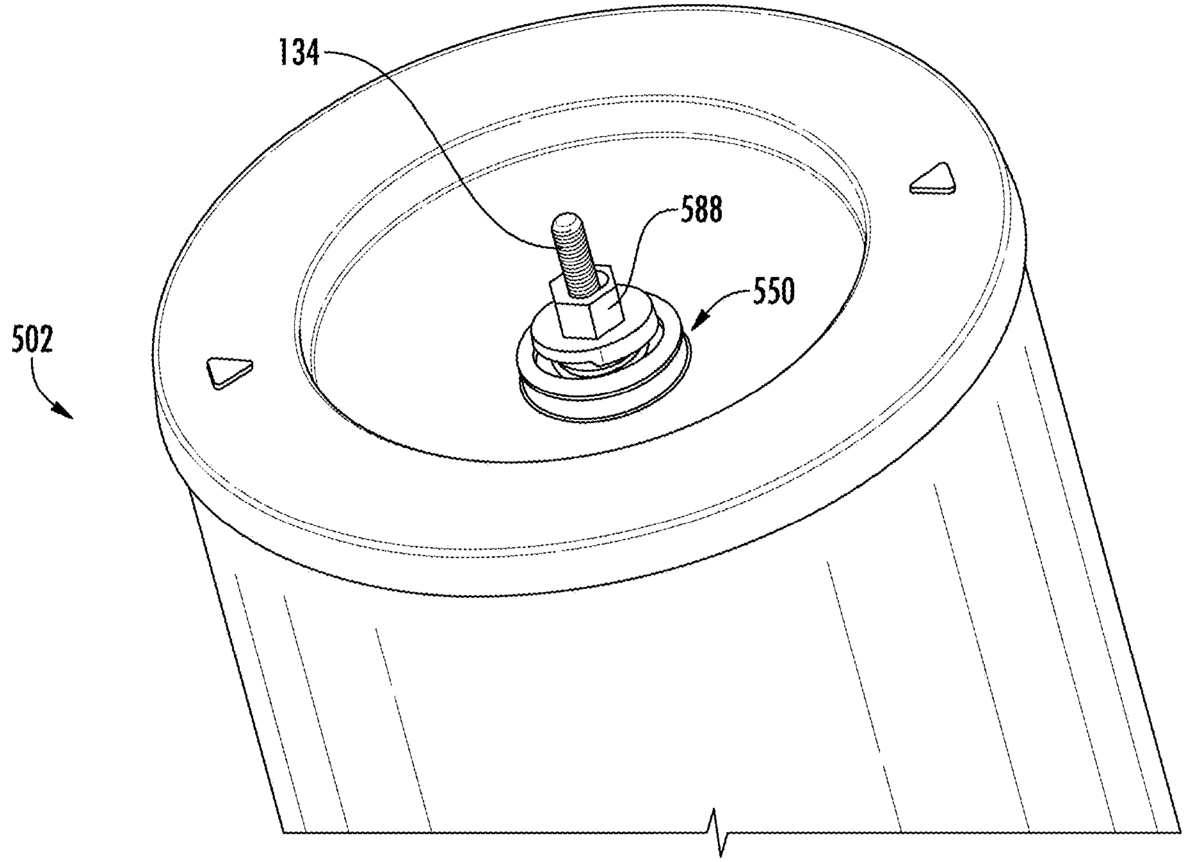
FIG. 16 is a partial perspective illustration of another example of a filter element and coupler that does not include a lever.
Figure 17:
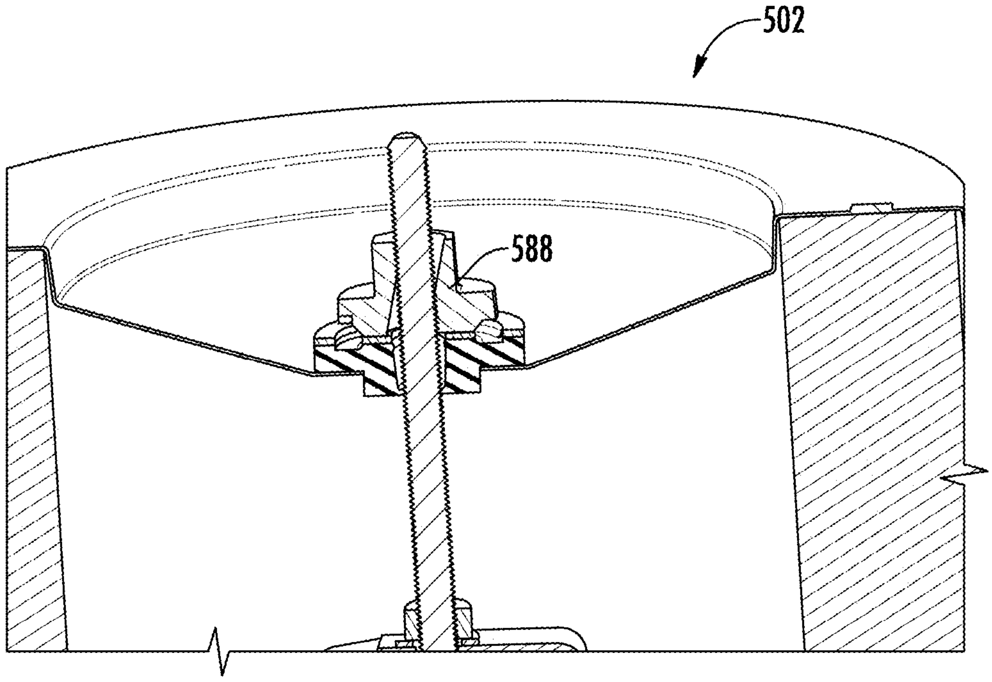
FIG. 17 is a partial cross-sectional illustration of FIG. 16

FIGS. 16 and 17 illustrates a coupler 588 that does not include the lever for securing the filter element 502. In other words, the coupler and levers are not a single continuous component). In this example, coupler 588 has an outer periphery configured to be engaged by a tool for imparting torque to the coupler 588. In this example, the outer periphery of coupler 588 is similar to a hexagonal nut. As such, the lever has not been illustrated but a lever configured to rotationally engage the coupler 588 would be provided.

In this example, the coupler 588 has the oval outer periphery and the compression member 550 has the oval cavity that cooperates with the oval periphery of the coupler as discussed above with the example of FIGS. 13-15.

Returning to the prior examples, the coupler 188 defines an internally threaded bore 190 that extends axially through the body 191 of the coupler 188. The threads 192 of the threaded bore define a threaded bore axis 194. This axis is generally orthogonal to axial pressure region 164 that applies pressure to the compression member 150 when securing the filter element 102 to the tube sheet 104. When the handle 108 is being tightened on the threaded shank 134, the threaded bore axis 194 is coincident with the axis 172. This is illustrated in FIGS. 4 and 5.

In this example, a clearance bore 196 intersects the internally threaded bore 190. The clearance bore 196 defines a clearance bore axis 198 that extends at a non-parallel angle to the threaded bore axis 194. The clearance bore 196 is sized and configured that when the clearance bore axis 198 is aligned with axis 172, the threads 192 of the threaded bore 190 do not engage threads 156 of shank 134. This is illustrated in FIG. 3. In this orientation, the handle can be slid axially along the threaded shank 134 with limited to no resistance and without requiring the user to rotate handle 108 about axis 172, as represented by arrow 200. This prevents the user from having to perform the conventional run-down of the nut on the threaded shank 134, which can be time consuming.

In some examples, the angle between axis 198 and axis 194 is between 10 and 20 degrees and preferably between 11 and 17.5 degrees.

Thus, prior to tightening or after sufficient loosening of handle 108, the user can quickly mount or remove handle 108.

When mounting the handle 108, the user would align the clearance bore 196 with the threaded shank 134 and slide handle 108 along shank 134 until it abuts first washer member 166 as illustrated in FIG. 3. Once in this position, the user would manipulate the handle 108 to pivot the handle 108 such that the threaded shank 134 is aligned with the threaded bore 190 and the threads 192 engage threads 156 as illustrated in FIG. 4. Thereafter, the user can rotate the handle 108 about axis 172 to tighten the handle 108 against the filter element 102. Notably, when the handle 108 is tight against the filter element, the axial pressure region 164 engages the top surface 170 of the first washer member 166 and prevents pivoting back to the orientation where the clearance bore 196 aligns with the threaded shank 134 (e.g. axis 198 aligns with axis 172). Only after the user has rotated the handle 108 to loosen the handle 108 can the handle be pivoted to the orientation of FIG. 3 and the handle quickly slid off of shank 134.

In a preferred arrangement, the lead angle of threads 156 and 192 cause the handle 108 to move axially along the threaded shank 134 quickly such that limited angular rotation of handle 108 is required to tighten handle 108 against the filter element 102. This reduces the likelihood of the handle 108 pivoting back to the orientation of FIG. 3 prior to sufficient force acting between axial pressure region 164 and the compression member 150 to maintain the handle 108 in the orientation of FIG. 4. In an example, only 2.5 turns of the handle 108 are required to reach the desired axial load on the filter element 102.

However, in some embodiments, knurling or texturing can be provided to surface 170 to further prevent back driving handle 108 or prevent pivoting to the orientation in FIG. 3.

In one example, this results in approximately 13 mm of travel of the handle 108 along shank 134.

This same thread pattern would be used with the helical wiper seal discussed above.

Further, a proprietary thread pitch could be provided.

In one example, the thread of the threaded shank 134 is m12×2.5 mm, 5 mm lead with 7.55 degree lead angle. The thread is based on an ISO 529 vee thread profile. The external thread minor diameter is 9.853 mm. The external thread major diameter is 12.49 mm. The internal thread minor diameter is 10.106 and the internal thread major diameter is 12.812 of the handle 108, nut 202 discussed below, and the helical wiper seal discussed above. The thread of the thread shank 134 can be a bespoke thread to assist with fast compression of the filter gaskets. A proprietary thread can further promote mounting of a correct filter element to the system. However, the use of standard thread configurations is also contemplated.

The over tighten features and the quick mount/release features of the arrangement discussed above may be used together or independent from one another.

With reference to FIGS. 1 and 2, in the illustrated example, the threaded shank 134 is provided by a carriage bolt 201 mounted to a yoke in the form of tripod 204. The tripod 204 is attached to the tube sheet 104 and the carriage bolt 201 is mounted to a free end of the tripod 204. In other embodiments, the threaded shank could be a rod directly attached to the tube sheet. By using a carriage bolt 201, the carriage bolt 201 can be clocked relative to the tripod 204 such that the carriage bolt 201 will not rotate when the user attempts to tighten the handle 108.

In some examples, a proprietary nut 202 can be used to secure carriage bolt 201 to tripod 204. The proprietary nut 202 will have an outer peripheral surface that requires a keyed tool to fasten the nut 202 to carriage bolt 201. Once the nut is torqued to 50 Nm, the only way it can be removed is destructively. This prevents a third party from using a different handle having a different thread pitch as compared to the proprietary thread pitch used with shank 134 discussed above.

While the system above is described with the quick mount coupler 188, other systems could incorporate other benefits of the examples while simply using a special nut that does not incorporate the clearance bore of the coupler discussed above.

It is contemplated that in some examples, the coupler, lever or the entire handle could be permanently attached to the filter. For instance, the coupler could be captured by the end plate 130 such that it could rotate relative to the end plate, but it could not be removed from the end plate 130.

Figure 28:
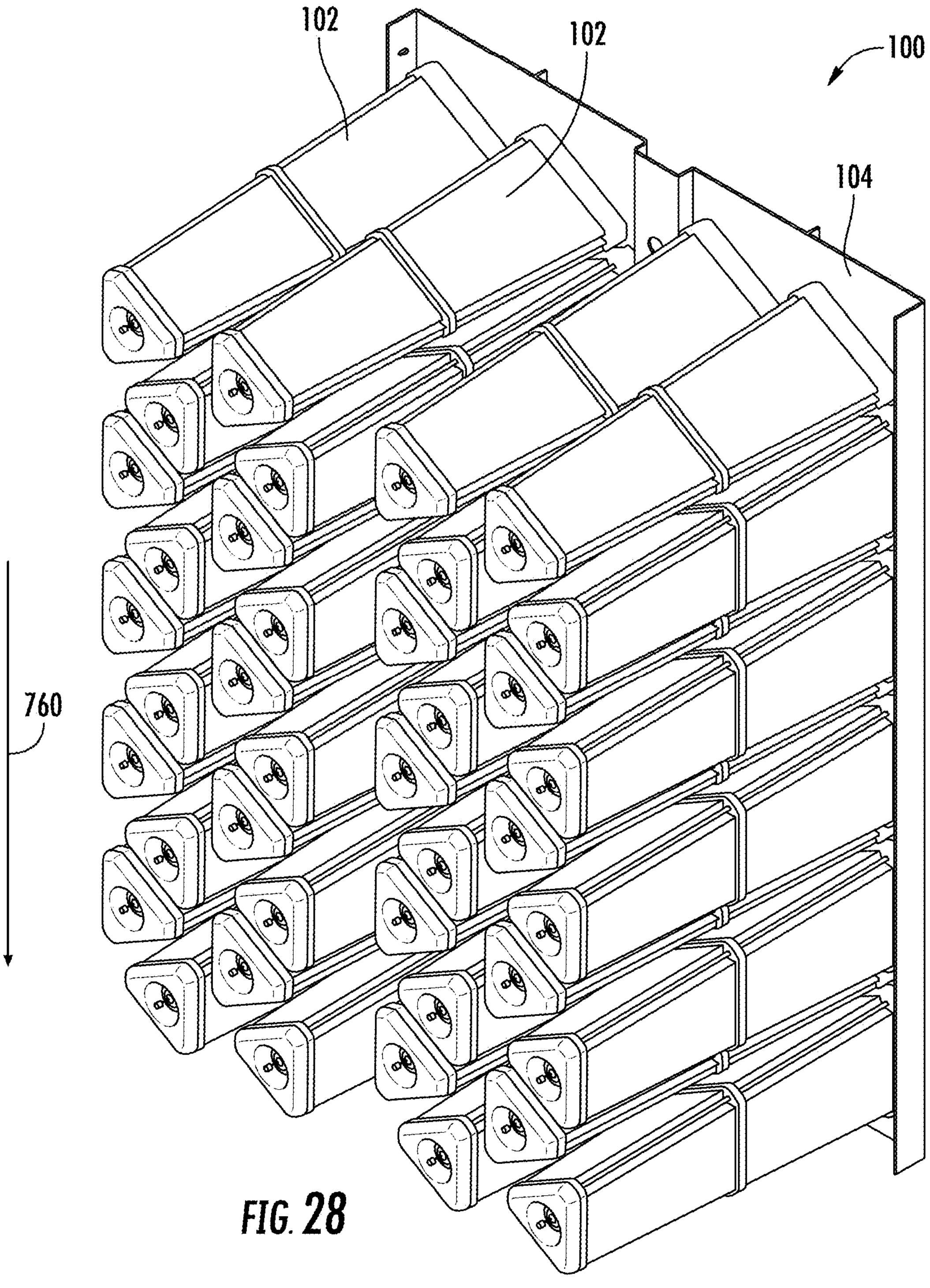
FIG. 28 is a perspective illustration of a filter system including a plurality of filter elements oriented in a cantilevered orientation relative to a vertically oriented tube sheet.

FIG. 28 is an alternative illustration of system 100 and illustrates more filter elements 102. In FIG. 28, the system 100 has the filter elements 102 in a cantilevered orientation with respect to tube sheet 104. Tube sheet 104 is oriented substantially vertical and parallel to gravity, which is illustrated as arrow 760. When the yoke of the system 100 is centered through an end plate 130 associated with a corresponding filter element 102, the force profile on the filter element 102 due to the cantilevered orientation can present sealing issues for the filter element 102 against the outer face of the tube sheet 104. The triangular cross-sectional shape of the filter elements 102 and orientation as illustrate could further exacerbate the sealing issues as sealing pressure at the vertically lower portion of the triangular seal could be different than the sealing pressure at the vertically upper portion of the triangular seal. This is due to gravitational forces that are not parallel to the clamping forces for securing the filter elements 102 against the tube sheet 104.

Figure 29:
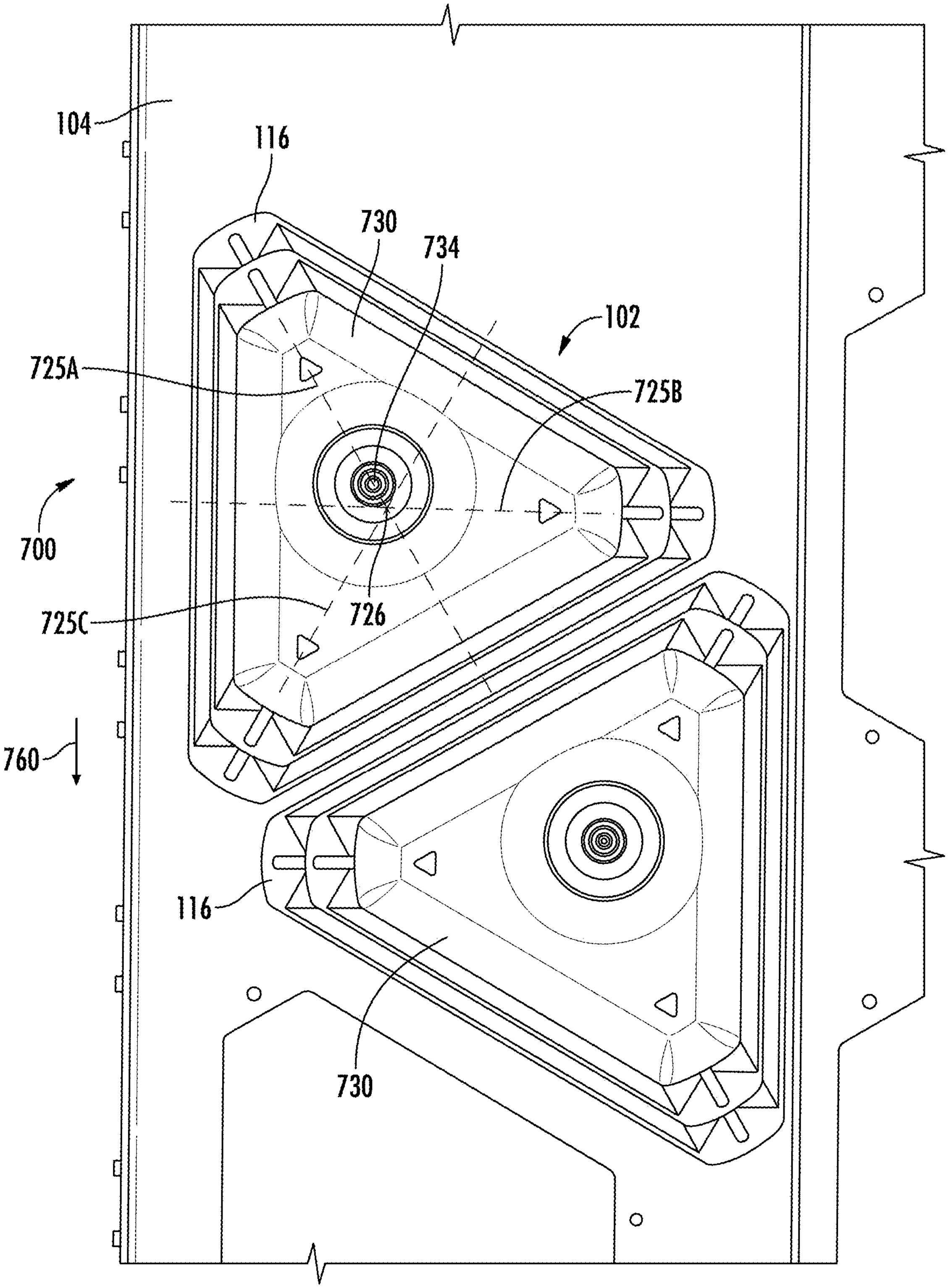
FIG. 29 is a partial front view of the filter system of FIG. 28 illustrating a pair of filter elements mounted to the tube sheet.

FIG. 29 illustrates an end view of a portion of a further system 700 that attempts to compensate for the sealing pressure imbalance and provide more uniform sealing pressure to the various seals within the system and particularly to tube sheet seal 116 of the filter elements 102. While only two filter elements are provided, this system 700 can incorporate any number of elements and as many, fewer than or more than system 100. To compensate for the forces provided by gravity, the mounting yoke 706 is configured such that the shank 734 of the mounting yoke 706 is off-center from center of the end plate 730 securing the filter element 102 to the tube sheet 104.

In addition, the shank 734 is off-center from the central axis of the filter element 102.

Figure 30:
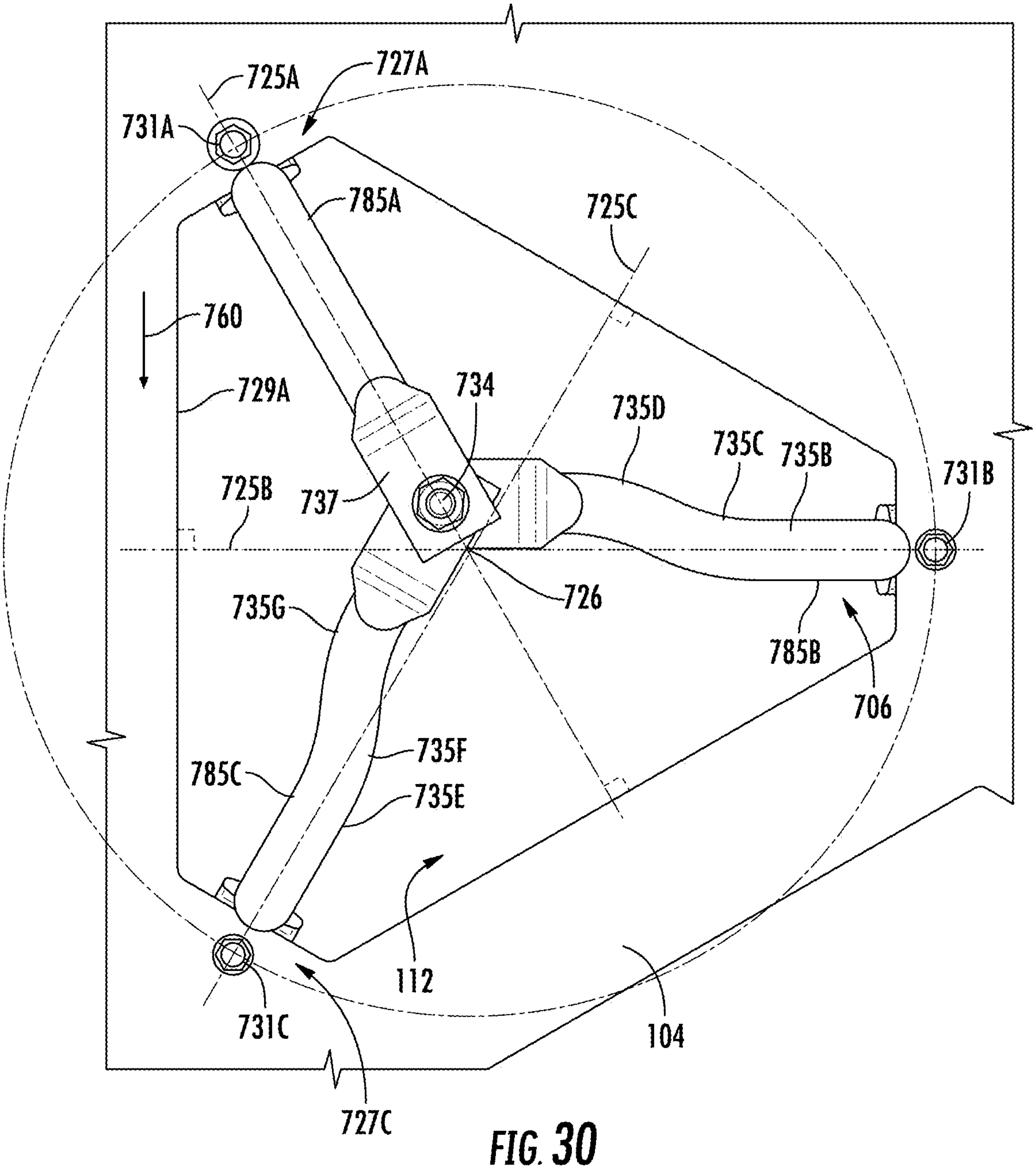
FIG. 30 is a front view of a mounting yoke of the filter system of FIG. 28 with the filter element removed illustrating the offset orientation of the mounting shank of the mounting yoke and the curved configuration of two of the legs of the mounting yoke.
Figure 31:
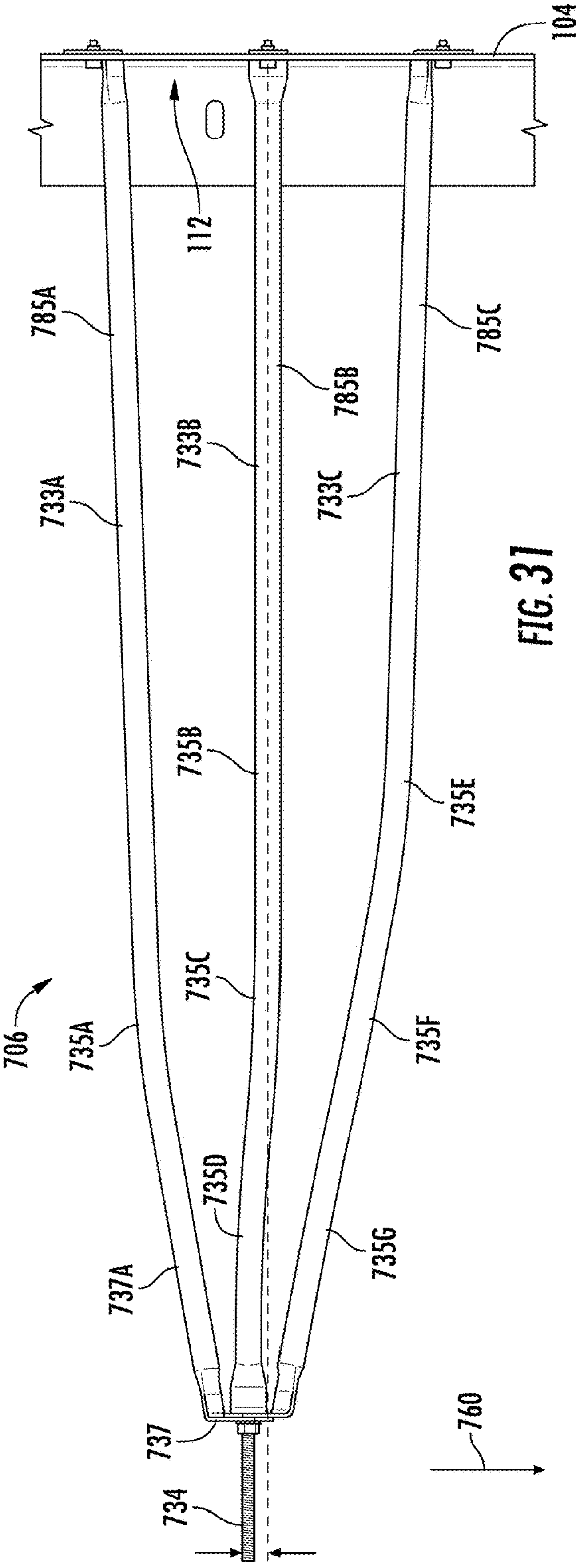
FIG. 31 is a side view illustration of the mounting yoke of FIG. 30 of the mounting yokes of the filter system of FIG. 28 with the filter element removed and illustrating how the mounting shank is offset vertically upward.

With additional reference to FIGS. 30 and 31, an alternative mounting yoke 706 is illustrated with the filter element 102 and end plate 730 removed. The shank 734 is moved toward the upper most corner 727A of the tube sheet aperture 112 along an axis 725A that generally extends through the center 726 of tube sheet aperture 112 and the upper most corner 727A of tube sheet aperture 112. In some examples, the axis 725A bisects corner 727A and passes through center 726. In doing so, the shank 734 is moved both vertically upward and horizontally relative to center 726. In this example, the shank 734 is moved towards the vertically oriented side 729A of tube sheet aperture 112.

In this example, the mounting yoke 706 includes three legs 785A, 785B, 785C. The shank 734 is moved horizontally away from the mounting location 731B of leg 785B and horizontally towards the mounting locations 731A, 731C of legs 785A and 785C. Further, the shank 734 is moved vertically upward toward the mounting location 731A of leg 785A and vertically away from the mounting locations 731B and 731C of legs 785B and 785C.

Notably, center 726 is typically co-axial about an axis perpendicular to the tube sheet 104 with a center of a circle defined by the mounting locations 731A, 731B, 731C of the legs 785A, 785B, 785C. As such, center 726 may be used to the center of either arrangement.

When the user mounts the filter element 102 to the mounting yoke 706, the upper most leg 785A becomes a tension leg, the bottom most leg 785C is a compression leg and the vertically intermediate leg 785B is a neutral leg. Leg 785A is considered a tension leg because it acts in tension during service prior to the filter element 102 being tightened against the tube sheet 104 while the filter element rests vertically on the mounting yoke 706 due to gravity. The lower most leg 785C is considered the compression leg because during service, prior to tightening the filter element 102 against the tube sheet, this leg is loaded in compression due to gravity. The intermediate leg 785B is referred to as a neutral leg because it generally provides lateral stability to the tension leg 785A and the compression leg 785C.

This off-center arrangement of the mounting shank 734 and associated configuration of the legs 785A, 785B, 785C redistributes the non-uniform gasket compression forces applied to tube sheet seal 116 and moves some of the loading that would otherwise be applied proximate the bottom most corner 727C (e.g. proximate mounting location 731C) due to the cantilevered configuration (e.g. associated with gravitational forces) upwards towards the upper most corner 727A (e.g. proximate mounting location 731A).

In this example, each leg 785A, 785B, 785C has its own profile to effectuate the load redistribution and off-center location of the mounting shank 734. However, the legs are generally designed so that they mate with the inner corners of the tube sheet seal 116 to provide clocking and proper seating of the filter element 102 as described previously with relation to mounting yoke 106. Thus, each leg 785A, 785B, 785C, when beginning at the end opposite the mounting shank 734 begins with a generally straight section 733A, 733B, 733C.

Leg 785A has bend 735A that is planar with a plan orthogonal to the tube sheet 104 and that includes axis 725A. This bend 735A allows the straight section 733A of leg 785A to extend outward from the tube sheet 104 at a more horizontal orientation (i.e. more perpendicular to tube sheet 104) than if leg 785A is straight between flattened tip 737 and the tube sheet 104. The horizontal orientation of leg 785A improves stability and also, when using multiple filter element sections, assists in guiding and positioning subsequently mounted filter element sections when assembling the full filter element.

Leg 785B is a more complex shape and has a first bend 735B, a second bend 735C and a third bend 735D. First bend 735B has a smaller radius that second and third bends 735C, 735D. First bend 735B is planar in that it is within a plane defined by axis 725B that is orthogonal to tube sheet 104. The second and third bends 735C, 735D are non-planar and bend out of the plane defined by axis 725B that is orthogonal to tube sheet 104. These non-planar bends 735C, 735D can be best viewed in FIG. 30. In general, the non-planar bends 735C, 735D in leg 785B compensate for the vertical shift of the mounting shank 734.

Leg 785C is generally a mirror of leg 785B and has first bend 735E, second bend 735F and third bend 735G. First bend 735E is planar in that it is within a plane defined by axis 725C that is orthogonal to tube sheet 104. The second and third bends 735F, 735G are non-planar and bend out of the plane defined by axis 725C that is orthogonal to tube sheet 104. These non-planar bends 735F, 735G can be best viewed in FIG. 30.

Preferably, the flattened tip 737 of leg 785A is the outermost tip and terminates over the other leg tips to maximize rigidity of the mounting yoke 706 and to better accommodate gravitational loads. Preferably, all flattened tips are generally parallel to one another as well as parallel to tube sheet 104 and the mounting shank 734 extends perpendicularly relative to the flattened tips as well as to the tube sheet 104.

Further, with reference to FIG. 31, the lengths of straight section 733A of leg 785A is longer than the straight sections 733B, 733C. In preferred embodiments, the lengths of all of the straight sections 733A, 733B, 733C are such that they extend into the outer most filter element section, e.g. filter element section 118, so that they can mate with the inner most end of the section and provide proper clocking and location of the filter element section by engaging the corners of any seal components thereof. However, this is not required in all examples.

Figure 32:
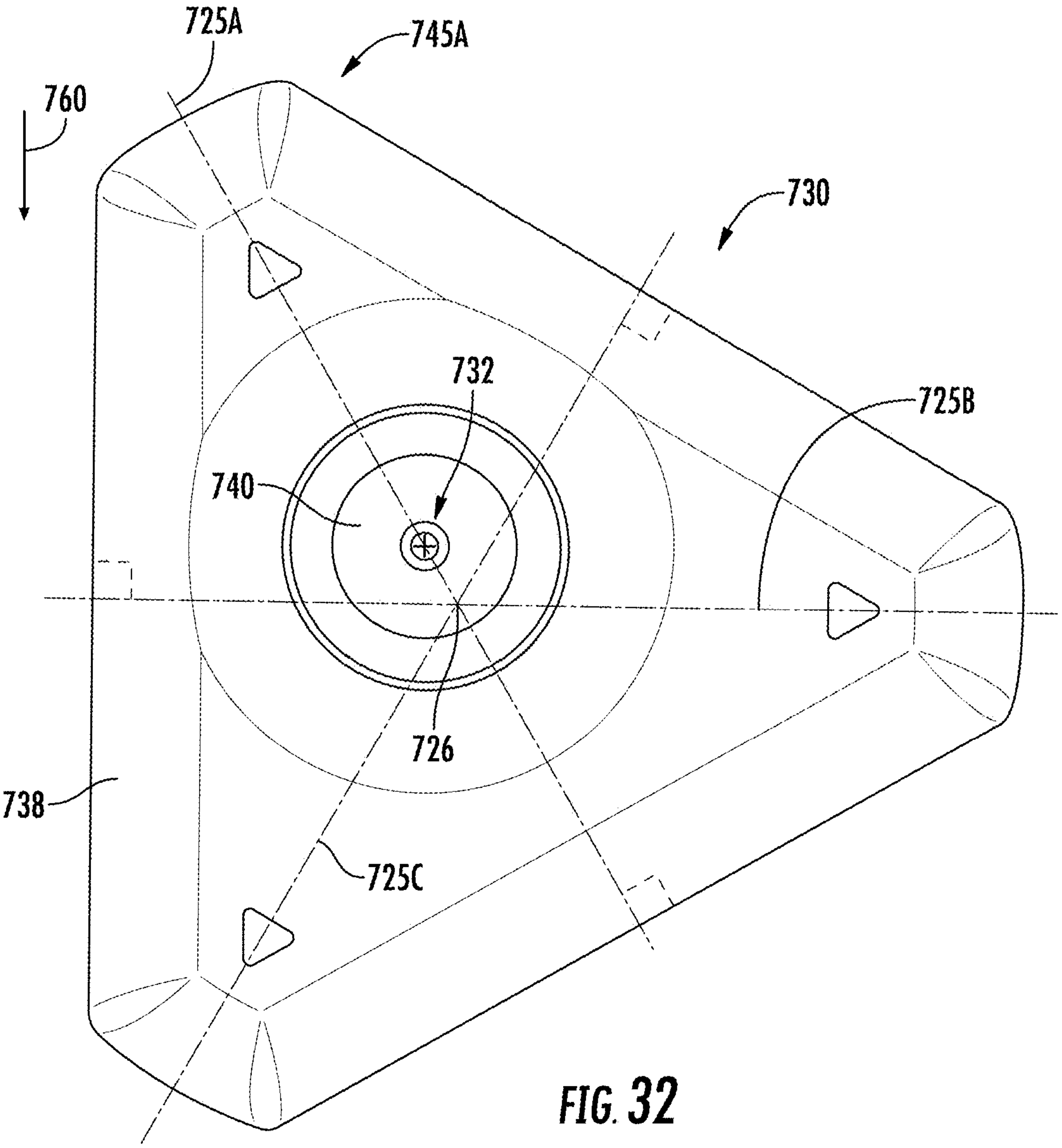
FIG. 32 is front view of an end plate for use with a filter element for securing the filter element to the mounting yoke of FIG. 30, the illustration illustrates the offset position of the mounting aperture of the end plate.
Figure 33:
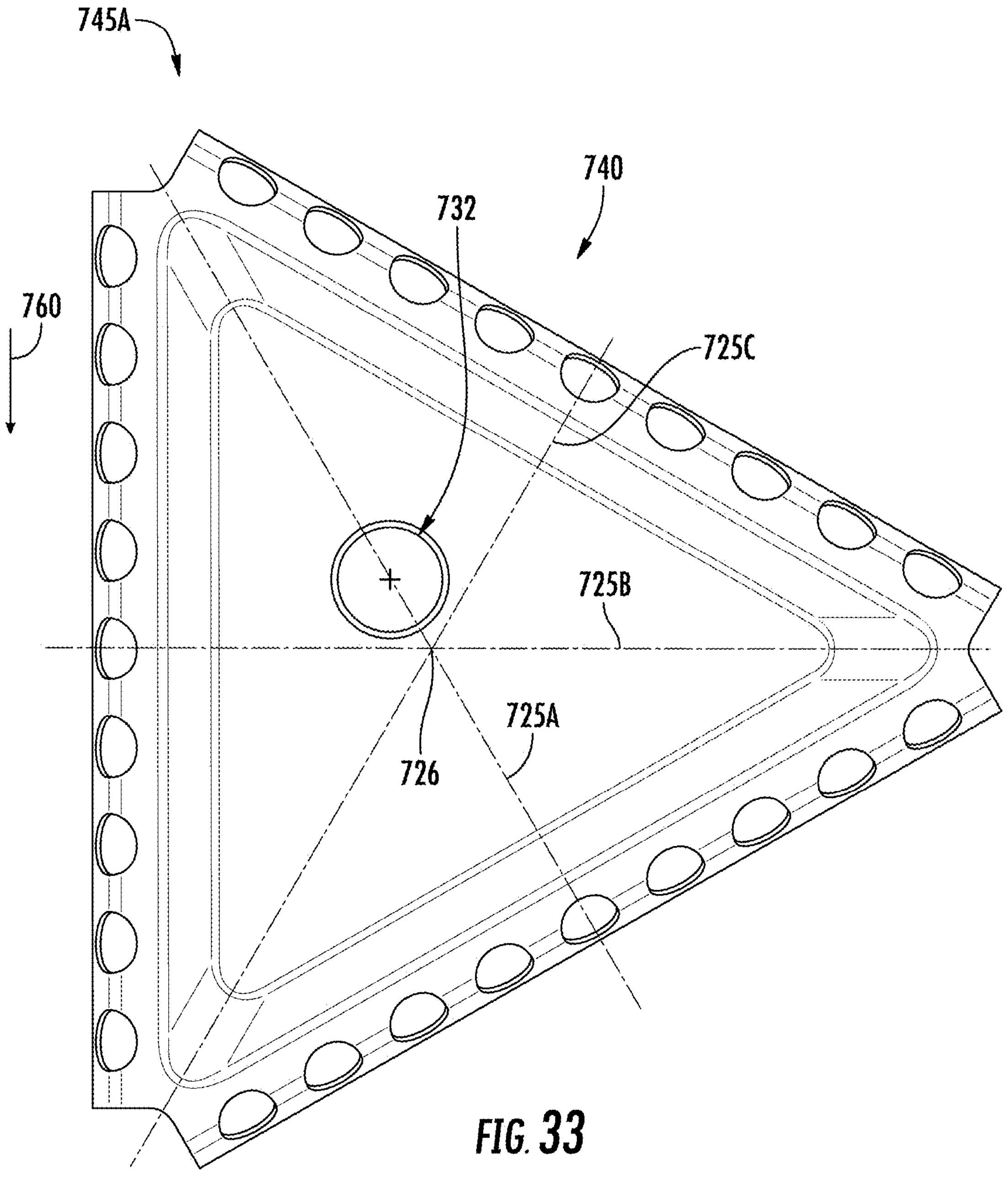
FIG. 33 is an inner plate of the end plate of FIG. 32.

FIG. 32 illustrates a corresponding end plate 730 and FIG. 33 illustrates an inner plate 732 of the end plate 730. These FIGS. 32 and 33 illustrate that in addition to the mounting shank 734 of the mounting yoke 706 being offset towards the mounting location 733A of leg 785A, endplate aperture 732 is similarly offset towards the corresponding corner 745A of the end plate 730 and the inner plate 740 of end plate 730 along axis 725A. Axis 725A is generally perpendicular to the side opposite corner 745A and generally bisects corner 745A.

In one example, the end plate 730 is reusable and the filter element 102 is the same as used in system 100. Here, the end plate 730 allows for the use of the same filter element 102 with either arrangement. In other embodiments, the end plate 730 may be formed as an integral component with the rest of the filter element or with one filter element section if the filter element is formed from a plurality of sections.

In a preferred example, the straight sections 733A, 733B, 733C and the tubesheet seal 116 are configured such that the inner periphery of the tube sheet seal 116 and particularly the corners of the tube sheet seal 116 are formed to mate with the straight sections 733A, 733B, 733C of legs 785A, 785B, 785C. Again, this is done to improve stability of the fit and helps enter the filter about the tube sheet aperture 112.

By redistributing the loading to provide more uniform sealing pressure all portions of the tube sheet seal 116 that the legs 785A, 785B, 785C compress simultaneously and more uniform and similarly all portions of the tube sheet seal 116 that engage tube sheet 104 compress simultaneously and more uniformly. This uniform compression of the tube sheet seal 116 reduces the torque required to achieve full tube sheet seal 116 compression. This also reduces or otherwise prevents over compression of some portions of the tube sheet seal 116, under compression of portions of the tube sheet seal 116, or a combination of both over and under compression of portions of the tube sheet seal 116.

The offset location of the mounting shank 734 causes the tension within the legs 785A, 785B, 785C generated when tightening a filter element 102 against the tube sheet 104 to be non-uniform. Instead, a larger portion of the tension acts through the uppermost leg 785A. This is due, in part, to the straighter profile of leg 785A. Combined with this arrangement, the reacting forces through the end plate 730 are transmitted along the axis of the filter element 102 but are shifted upward toward upper portions of the tube sheet seal 116 (and other seals). This redistribution of loads through the filter element 102 results in more uniform compression of all seals.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The term "at least one of A and B" shall be understood to mean "only A, only B or both A and B."

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element comprising:

a tube of filter media extending axially between a first end and a second end and defining a central cavity, the tube of filter media being frustoconical increasing in radial dimension when moving along a central axis from the second end towards the first end, the tube of filter media extending at a first angle relative to the central axis, the filter media of the tube of filter media having a radially inner most edge at the first end;

a seal member attached to a first end of the tube of filter media, the seal member having a radially inward facing tapered inner surface, the tapered inner surface extending at a second angle relative to the central axis; and wherein:

the first angle is more parallel to the central axis than the second angle;

the seal member is annular;

the seal member includes:

an annular sealing rib extending axially outward and away from the tube of filter media;

a first annular abutment shoulder extending axially outward and away from the tube of filter media, the first annular abutment shoulder spaced radially from the annular sealing rib forming a first channel therebetween.

2. The filter element of claim 1, wherein:

the first seal member includes a second annular abutment shoulder extending axially outward and away from the tube of filter media;

the second annular abutment shoulder spaced radially from the annular sealing rib forming a second channel therebetween; and the annular sealing rib being positioned radially between the first and second annular abutment shoulders.

3. The filter element of claim 1, wherein:

the tube of filter media has a generally polygonal cross-sectional shape in a plane orthogonal to a central axis extending between the first and second ends; and the annular sealing rib includes a plurality of straight sides connected by corner regions, a radial thickness of the straight sides is greater than a radial thickness in the corner region.

4. The filter element of claim 1, wherein:

the first seal member includes a second annular abutment shoulder extending axially outward and away from the tube of filter media, the second annular abutment shoulder spaced radially from the annular sealing rib forming a first channel therebetween;

the axially outermost end of the annular sealing rib being spaced axially outward away from the tube of filter media a greater distance than an axially outermost end of the first annular abutment shoulder;

the axially outermost end of the annular sealing rib being spaced axially outward away from the tube of filter media a greater distance than an axially outermost end of the second annular abutment shoulder.

5. A filter element comprising:

a tube of filter media extending axially between a first end and a second end and defining a central cavity, the tube of filter media being frustoconical increasing in radial dimension when moving along a central axis from the second end towards the first end, the tube of filter media extending at a first angle relative to the central axis, the filter media of the tube of filter media having a radially inner most edge at the first end;

a seal member attached to a first end of the tube of filter media, the seal member having a radially inward facing tapered inner surface, the tapered inner surface extending at a second angle relative to the central axis; and the first angle being more parallel to the central axis than the second angle;

wherein:

the tapered inner surface of the seal member has a first surface edge, the first surface edge being an axially outermost extent of the tapered inner surface of the seal member that is spaced axially the furthest from the first end of the tube of filter media, the first surface edge is positioned radially outward of the inner most edge of the tube of filter media at the first end;

the tapered inner surface of the seal member has a second surface edge opposite the first surface edge, the second surface edge being closer to the second end of the tube of filter media than the first surface edge, the second surface edge is positioned radially inward of the first surface edge and radially inward of the inner most edge of the tube of filter media at the first end.

6. The filter element of claim 5, wherein the first and second angles are less than 90 degrees.

7. The filter element of claim 5, wherein:

the cross-sectional shape of the tube of filter media and the first seal member is generally polygonal;

the polygonal shape of the seal member defining a plurality of straight sides interconnected by a plurality of corner regions; and the second angle being measured in a portion of the polygonal shape of the seal member defined by a straight side.

8. A filter system comprising:

a tube sheet defining a flow aperture therethrough;

a filter element mounted to the tube sheet, the filter element including:

a tube of filter media defining a central cavity, the tube of filter media extending between first and second ends along a central axis, the first end being adjacent the tube sheet;

a first seal member attached to the first end of the tube of filter media, the first seal member being annular and defining a flow opening in fluid communication with the central cavity, the first seal member including a radially inward facing surface, the radially inward facing surface is tapered at a first angle relative to the central axis of the tube of filter media such that the radially inward facing surface is spaced further from the central axis when moving axially away from the tube of filter media;

wherein:

the seal member is annular;

the seal member includes:

an annular sealing rib extending axially outward and away from the tube of filter media;

a first annular abutment shoulder extending axially outward and away from the tube of filter media, the first annular abutment shoulder spaced radially from the annular sealing rib forming a first channel therebetween.

9. The filter system of claim 8, wherein:

the tube of filter media is frustoconical and is tapered relative to the central axis at a second angle such that an outer periphery of the tube of filter media increases in radial dimension when moving from the second end towards the first end; and the second angle is more parallel to the central axis than the first angle.

10. The filter system of claim 8, wherein:

the first end of the tube of filter media defines an inner edge; and the inner edge is spaced radially inward of a periphery of the flow aperture through the tube sheet.

11. The filter system of claim 10, wherein the tube of filter media has a plurality of first sides and the flow aperture through the tube sheet has a plurality of second sides, the plurality first sides and plurality of second sides have a same number of sides, corresponding ones of the first and second sides being parallel;

the inner edge of the tube of filter media extending along, at least, the plurality of first sides;

the periphery of the flow aperture through the tube sheet extending along, at least in part, the plurality of second sides.

12. The filter system of claim 8, wherein:

the radially inward facing surface has a first surface edge spaced axially from the tube of filter media; and the first surface edge being spaced radially between the inner edge of the tube of filter media and the periphery of the flow aperture.

13. The filter system of claim 12, wherein the radially inward facing surface has a second surface edge, the second surface edge being closer to the second end of the tube of filter media than the first surface edge, the second surface edge being spaced radially inward of the first surface edge.

14. The filter system of claim 12, wherein the first surface edge is formed at the intersection of the first annular abutment shoulder and the radially inward facing surface.

15. The filter system of claim 14, wherein the first annular abutment shoulder abuts the tube sheet when the filter element is mounted to the tube sheet.

* * * * *